(12) United States Patent
Dodle et al.

(10) Patent No.: US 12,354,271 B2
(45) Date of Patent: *Jul. 8, 2025

(54) IMAGING DEVICE AND A METHOD FOR IMAGE GENERATION OF A SPECIMEN

(71) Applicant: Pramana, Inc., Cambridge, MA (US)

(72) Inventors: Durgaprasad Dodle, Telangana (IN); Ayush Shah, PO Defence Colony (IN); Parveen Shaik Gangirevula, Bengaluru (IN); Lokeshkumar Venkata Veera Puvvada, Andhra Pradesh (IN); Pavani Pallavi Pelluru, Pocharam (IN); Raghubansh Bahadur Gupta, Bangalore (IN); Prasanth Perugupalli, Cary, NC (US)

(73) Assignee: Pramana, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/430,863

(22) Filed: Feb. 2, 2024

(65) Prior Publication Data

US 2025/0037280 A1 Jan. 30, 2025

Related U.S. Application Data

(63) Continuation of application No. 18/226,058, filed on Jul. 25, 2023, now Pat. No. 11,983,874.

(51) Int. Cl.
| | |
|---|---|
| *H04N 23/695* | (2023.01) |
| *G06T 5/50* | (2006.01) |
| *G06T 7/00* | (2017.01) |
| *G06T 7/11* | (2017.01) |
| *G06T 7/80* | (2017.01) |
| *H04N 23/69* | (2023.01) |

(52) U.S. Cl.
CPC .............. *G06T 7/0014* (2013.01); *G06T 5/50* (2013.01); *G06T 7/11* (2017.01); *G06T 7/80* (2017.01); *H04N 23/69* (2023.01); *H04N 23/695* (2023.01); *G06T 2207/10056* (2013.01); *G06T 2207/20081* (2013.01); *G06T 2207/30024* (2013.01)

(58) Field of Classification Search
CPC .. G02B 21/367; G02B 21/006; G02B 21/088; G02B 21/244; G02B 21/245; G02B 21/34; G02B 7/38; G02B 13/0095; G02B 21/0032
USPC .......................................................... 348/79
See application file for complete search history.

(56) References Cited

U.S. PATENT DOCUMENTS

| | | | |
|---|---|---|---|
| 8,199,997 B2 | 6/2012 | Rutenberg | |
| 11,449,973 B2 | 9/2022 | Rutenberg | |
| 11,636,627 B2 * | 4/2023 | Siegel | G02B 21/361 348/79 |

(Continued)

OTHER PUBLICATIONS

International Search Report; PCT/US2024/039433; Date: Oct. 21, 2024; By: Authorized Officer Kari Rodriquez.

*Primary Examiner* — Masum Billah
(74) *Attorney, Agent, or Firm* — Caldwell Intellectual Property Law

(57) ABSTRACT

An imaging device for image generation of a specimen is disclosed. Layers of images may be captured by an optical system and then compiled to create an integrated image. Each layer may include a different focal point. A consolidated image may then be created by combining one or more integrated images.

20 Claims, 10 Drawing Sheets

(56) References Cited

U.S. PATENT DOCUMENTS

| | | | |
|---|---|---|---|
| 11,983,874 B1 | 5/2024 | Dodle et al. | |
| 2006/0013454 A1* | 1/2006 | Flewelling | G06T 11/00 |
| | | | 382/128 |
| 2011/0164314 A1* | 7/2011 | Shirota | G06F 3/0481 |
| | | | 359/368 |
| 2011/0242308 A1* | 10/2011 | Igarashi | G02B 21/16 |
| | | | 348/79 |
| 2012/0127297 A1 | 5/2012 | Baxi et al. | |
| 2012/0127397 A1 | 5/2012 | Yamamoto | |
| 2013/0250144 A1 | 9/2013 | Takayama | |
| 2014/0125776 A1 | 5/2014 | Damaskinos et al. | |
| 2019/0075247 A1 | 3/2019 | Vink et al. | |
| 2020/0279354 A1 | 9/2020 | Klaiman | |
| 2021/0149170 A1 | 5/2021 | Leshem et al. | |
| 2021/0151287 A1* | 5/2021 | Hyde | H01J 37/28 |
| 2022/0058776 A1 | 2/2022 | Ozcan | |
| 2022/0179187 A1* | 6/2022 | Harfouche | G02B 26/08 |
| 2023/0143800 A1* | 5/2023 | Casas | H04L 65/61 |
| | | | 348/79 |

\* cited by examiner

IMAGING DEVICE AND A METHOD FOR IMAGE GENERATION OF A SPECIMEN

CROSS-REFERENCE TO RELATED APPLICATIONS

This application is a continuation of Non-provisional application Ser. No. 18/226,058 filed on Jul. 25, 2023, and entitled "IMAGING DEVICE IMAGING DEVICE AND A METHOD FOR IMAGE GENERATION OF A SPECIMEN", the entirety of which is incorporated herein by reference.

FIELD OF THE INVENTION

The present invention generally relates to the field of real-time image generation. In particular, the present invention is directed to an imaging device and a method for image generation of a specimen with variable thickness.

BACKGROUND

Extended depth of focus techniques for digital acquisition of pathology slides are useful. However, extended depth of focus is difficult and cumbersome when generating an image for a specimen having a variable thickness.

SUMMARY OF THE DISCLOSURE

In an aspect, an imaging device for image generation is disclosed. The imaging device includes at least a processor and a memory communicatively connected to the at least a processor. The memory instructs the processor to receive a parameter set, capture a first plurality of images of a first area of interest at a first location of a specimen and a second plurality of images of a second area of interest at a second location of the specimen, compile the first plurality of layers into a first integrated image and the second plurality of layers into a second integrated image, combine the first integrated image and the second integrated image into a consolidated image, and display the consolidated image.

In another aspect, a method for image generation is disclosed. The method includes receiving, using at least a processor, A method of image generation of a specimen includes receiving, by a processor, a parameter set; capturing, by the processor, a first plurality of images of a first area of interest at a first location of a specimen and a second plurality of images of a second area of interest at a second location of the specimen, compiling, by the processor, the first plurality of layers into a first integrated image and the second plurality of layers into a second integrated image, combining, by the processor, the first integrated image and the second integrated image into a consolidated image, and displaying, by the processor, the consolidated image.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an imaging device and a method for image generation of a specimen. More specifically, embodiments of the present disclosure relate to imaging device and methods for enhancing extended depth of focus (EDOF) techniques for digital image acquisition of pathology glass slides. In one or more embodiments, imaging device enables acquisition of specimen that have variable thickness and leverages the focus information from an acquired location to dynamically configure the size of stacked images collected for use in acquisition of a subsequent location. Exemplary embodiments illustrating aspects of the present disclosure are described below in the context of several specific examples.

Figure 1A:
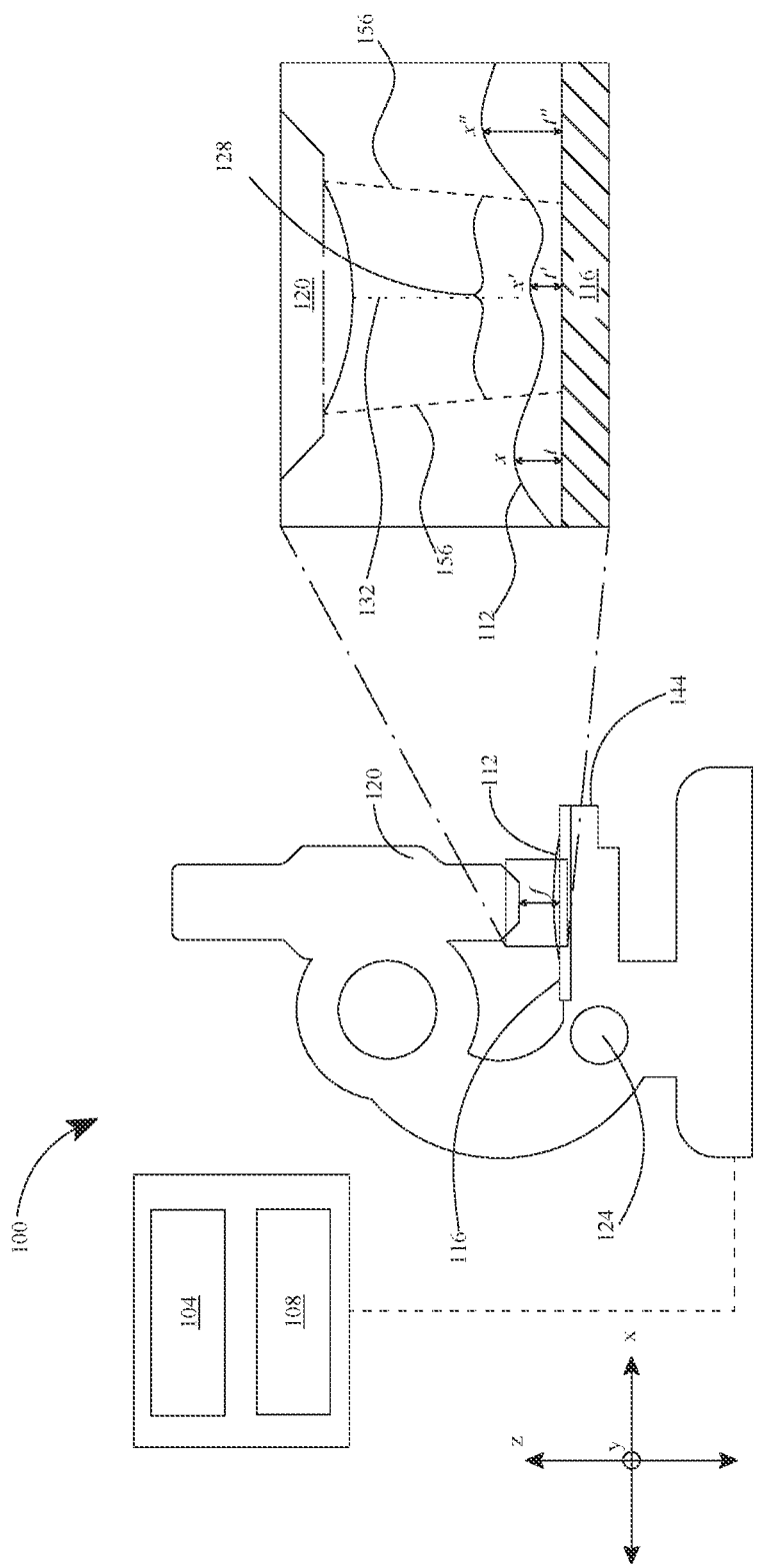
FIGS. 1A-1C are various diagrammatic representations of an exemplary embodiment of an imaging device for image generation of a specimen in accordance with one or more embodiments of the present disclosure.

Referring now to FIG. 1A, an exemplary embodiment of an imaging device 100 for image generation for specimen with variable thickness is illustrated. In one or more embodiments, imaging device 100 may include an optical instrument. For instance, and without limitation, imaging device 100 may include a microscope. In one or more embodiments, imaging device 100 may include an application-specific integrated circuit (ASIC). ASIC may be communicatively connected to a memory, such as memory 108. Memory may include rea-only memory (ROM) and/or rewritable ROM, FPGA, or other combinational and/or sequential synchronous or non-synchronous digital circuitry to store parameters described further in this disclosure. In one or more embodiments, memory may include one or more memory devices to store data and information, such as parameters or metrics. The one or more memory devices may include various types of memory including, but not limited to, volatile and non-volatile memory devices, such as, for example, ROM (Read-Only Memory), EEPROM (Electrically-Erasable Read-Only Memory), RAM (Random Access Memory), flash memory, and the like. In one or more embodiments, embodiment, processor is adapted to execute software stored in memory to perform various methods, processes, and modes of operations in manner as described in this disclosure. In other embodiments, imaging device 100 may include circuitry. For instance, and without limitation, imaging device 100 may include programming in software and/or hardware circuit design. In one or more embodiments, imaging device 100 may include a processor 104. Processor 104 may include, without limitation, any processor 104 described in this disclosure. Processor 104 may include or be included in any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of imaging device 100 and/or computing device.

With continued reference to FIG. 1A, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1A, imaging device 100 includes a memory 108. Memory 108 is communicatively connected to processor 104. Memory may contain instructions configuring processor 104 to perform tasks disclosed in this disclosure. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, imaging device, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example, and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, without limitation, via a bus or other facility for intercommunication between elements of a computing device. Communicative connecting may also include indirect connections via, for example, and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1A, imaging device 100 may include one or more sensors for capturing image signals representative of an image of a scene (e.g., a scene including specimen 112). For instance, and without limitation, a sensor may include a light sensor, image sensor (as described further below), focal plane array, and the like. In various embodiments, sensors may provide for representing and/or converting a captured image signal of a scene to digital data. For instance, and without limitation, sensor may include an analog-to-digital converter. In one or more embodiments, processor 104 may be adapted to receive image signals from imaging device 100 (e.g., image sensor), process image signals to provide processed image data, store image signals and/or image data in memory 108, and/or retrieve stored image signals and/or image data from memory 108 (e.g., for compilation or combinations as discussed further in this disclosure). In one or more embodiments, processor 104 may be configured to process image signals stored in memory 108 to provide image data to display for viewing by a user and/or operator.

Figure 8:
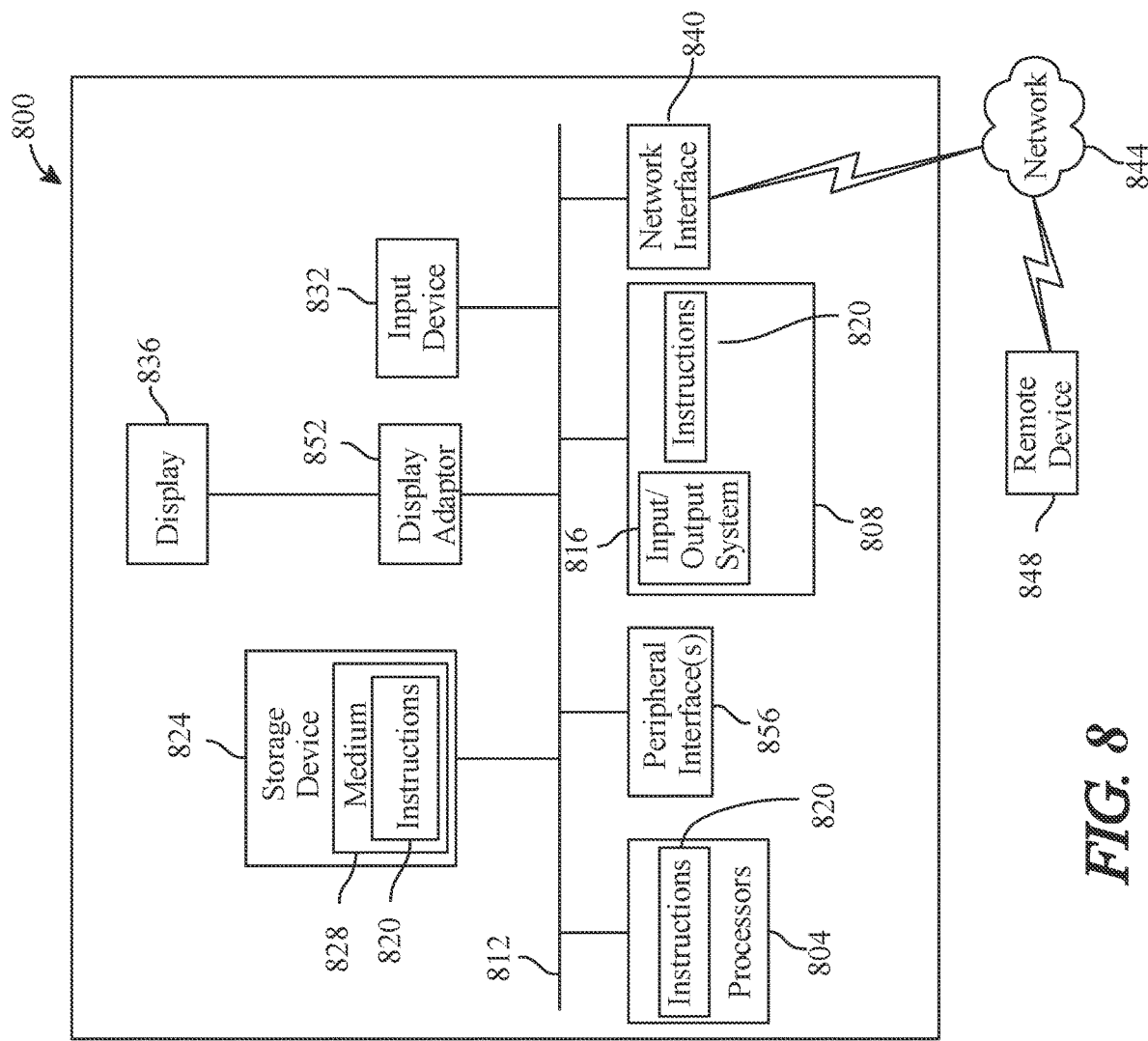
FIG. 8 is a block diagram of a computing system that can be used to implement any one or more of the methodologies disclosed herein and any one or more portions thereof.

Still referring to FIG. 1A, in one or more embodiments, imaging device may include and/or be communicatively connected to a display, which is discussed further in FIG. 8. In one or more embodiments, display may be configured to display image data and any other information described in this disclosure, such as annotations or text. In one or more embodiments, processor 104 may be configured to retrieve image data and information from memory 108 and display such image data and information on display. In other embodiments, display may receive image data directly from optical system, such as optical system 120 (e.g., optical sensor).

Still referring to FIG. 1A, imaging device 100 may include a user input and/or user interface. For instance, and without limitation, user interface may include one or more user actuated components, such as, for example, one or more push buttons, joysticks, slide bars, rotatable knobs, a mouse, a keyboard, touchscreens, and the like that may be configured to generate one or more input control signals, where an input control signal may include a signal to capture an image from a scene, combine images and/or image data, compile images and/or image data, alter modes of operation of imaging device, alter zoom and/or levels of zoom, alter focus, and the like. User input signals may be generated using user interface and transmitted to processor 104, memory 108, display, optical system 120, and/or any other component of and/or communicatively connected to imaging device 100. In one or more embodiments, processor may be configured to alter or set modes of operation of imaging device, such as but not limited to, auto-focus, contrast, gain (e.g., variable gain), field of view (FOV), brightness, offset, menu enablement and selection, spatial setting, temporal setting, and the like.

With continued reference to FIG. 1A, in some embodiments, imaging device 100 may be used to generate an image of a specimen 112. For the purposes of this disclosure, a "specimen" is a sample of organic material used for testing or observation purposes. In one or more embodiments, specimen may include a pathology sample. For instance, and without limitation, a specimen may include a sample of interest, including tissue, plasma, or fluid from an individual. For example, and without limitation, specimen 112 may include tissue from an organ, such as a kidney, of an individual (e.g., patient). In some embodiments, specimen 112 may include a tissue sample. In some embodiments, specimen 112 may be frozen. In some embodiments, specimen 112 may be fresh or recently harvested. In one or more embodiments, specimen 112 may include a variable thickness. For instance, and without limitation, specimen 112 may have a different thickness or depth at various locations along specimen 112. For example, and without limitation, specimen 112 may have a first thickness t at a first location x, a second thickness t' at a second location x', and a third thickness t" at a third location x".

With continued reference to FIG. 1A, in one or more embodiments, specimen 112 may be disposed on a slide 116. As used in this disclosure, a "slide" is a container or surface for holding a specimen. In some embodiments, slide 116 may include a formalin fixed paraffin embedded slide. In some embodiments, specimen 112 on slide 116 may be stained. In some embodiments, slide 116 may be substantially transparent. In some embodiments, slide 116 may include a glass slide. In some embodiments, slide 116 may include a thin, flat, and substantially transparent glass slide. In some embodiments, a cover, such as a transparent cover, may be applied to slide 116 such that specimen 112 is disposed between slide 116 and cover. For example, and without limitation, specimen 112 may be compressed between slide 116 and corresponding cover.

Still referring to FIG. 1A, in some embodiments, slide 116 and/or a sample on slide 116 may be illuminated. In some embodiments, imaging device 100 may include a light source. As used in this disclosure, a "light source" is any device configured to emit electromagnetic radiation. In some embodiments, light source may emit a light having substantially one wavelength. In some embodiments, light source may emit a light having a wavelength range. Light source may emit, without limitation, ultraviolet light, visible light, and/or infrared light. In non-limiting examples, light source may include a light-emitting diode (LED), an organic LED (OLED) and/or any other light emitter. Such a light source may be configured to illuminate slide 116 and/or specimen 112 on slide 116. In a non-limiting example, light source may illuminate slide 116 and/or specimen 112 on slide 116 from below. In a non-limiting example, light source may illuminate slide 116 and/or specimen 112 on slide 116 from above.

Still referring to FIG. 1A, in some embodiments, imaging device 100 may include at least an optical system 120. As used in this disclosure, an "optical system" is an arrangement of one or more components which together act upon or employ electromagnetic radiation, such as light (e.g., visible light, infrared light, UV light, or the like). Optical system 120 may include one or more optical elements, including without limitation lenses, mirrors, windows, filters, and the like. Optical system 120 may form an optical image that corresponds to an optical object. For instance, and without limitation, optical system 120 may form an optical image at or upon an optical sensor, which can capture, e.g., digitize, the optical image. In some cases, optical system 120 may have at least a magnification. For instance, and without limitation, optical system 120 may include an objective (e.g., microscope objective) and one or more reimaging optical elements that together produce an optical magnification. In some cases, a degree of optical magnification may be referred to herein as zoom. As used herein, an "optical sensor" is a device that measures light and converts the measured light into one or more signals; one or more signals may include, without limitation, one or more electrical signals. In some embodiments, optical sensor may include at least a photodetector. As used herein, a "photodetector" is a device that is sensitive to light and thereby able to detect light. In some embodiments, a photodetector may include a photodiode, a photoresistor, a photosensor, a photovoltaic chip, and the like. In some embodiments, optical sensor may include a plurality of photodetectors. Optical sensor may include, without limitation, a camera. Optical sensor may be in electronic communication with at least a processor 104 of imaging device 100. As used herein, "electronic communication" as used in this disclosure is a shared data connection between two or more devices. In some embodiments, imaging device 100 may include two or more optical sensors.

Still referring to FIG. 1A, in some embodiments, optical system 120 may include a camera. In some cases, a camera may include one or more optics. Exemplary non-limiting optics include spherical lenses, aspherical lenses, reflectors, polarizers, filters, windows, aperture stops, and the like. In some embodiments, one or more optics associated with a camera may be adjusted in order to, in non-limiting examples, change the zoom, depth of field, and/or focus distance of the camera. In some embodiments, one or more of such settings may be configured to detect a feature of a sample on slide 116. In some embodiments, one or more of such settings may be configured based on a parameter set, as described below. In some embodiments, camera may capture images at a low depth of field. In a non-limiting example, camera may capture images such that a first depth of sample is in focus and a second depth of sample is out of focus. In some embodiments, an autofocus mechanism may be used to determine focus distance. In some embodiments, focus distance may be set by parameter set. In some embodiments, camera may be configured to capture a plurality of images at different focus distances. In a non-limiting example, camera may capture a plurality of images at different focus distances, such that images are captured where each focus depth of the sample is in focus in at least one image. In some embodiments, at least a camera may include an image sensor. Exemplary non-limiting image sensors include digital image sensors, such as without limitation charge-coupled device (CCD) sensors and complimentary metal-oxide-semiconductor (CMOS) sensors. In some embodiments, a camera may be sensitive within a non-visible range of electromagnetic radiation, such as without limitation infrared.

Still referring to FIG. 1A, in some embodiments, imaging device 100 may include a machine vision system. Machine vision system may include optical system 120 or may be communicatively connected to optical system 120, processor 104, memory 108, and the like. In some embodiments, a machine vision system may include at least a camera. A machine vision system may use images, such as images from at least a camera, to make a determination about a scene, space, and/or object. For example, in some cases a machine vision system may be used for world modeling or registration of objects within a space. In some cases, registration may include image processing, such as without limitation object recognition, feature detection, edge/corner detection, and the like. Non-limiting example of feature detection may include scale invariant feature transform (SIFT), Canny edge detection, Shi Tomasi corner detection, and the like. In some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z-axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy-plane of a first frame; a result, x and y translational components and ϕ may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy-plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level. In some cases, a machine vision system may use a classifier, such as any classifier described throughout this disclosure. A z-axis, as used in this disclosure, is an axis that is orthogonal to the xy-plane and, thus, a top surface of slide 116.

Figure 1B:
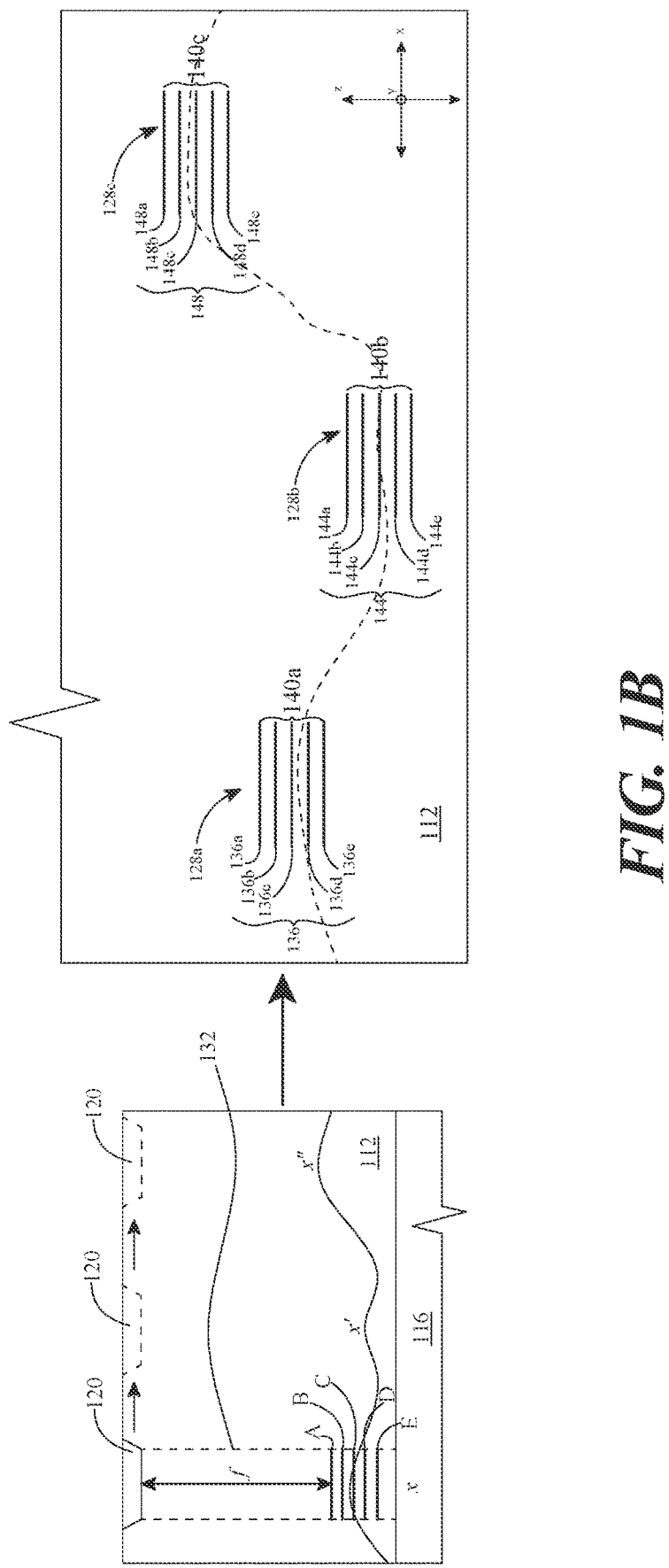

With continued reference to FIG. 1A, optical system 120 may be configured to capture an image, such as images 136*a-e* of FIG. 1B, of an area of interest 128. For example, and without limitation, a camera of optical system 120 may be configured to capture an image of an area of interest. For the purposes of this disclosure, an "area of interest" is a region of a scene or environment that is selected or desired to be positioned within a line of sight and, thus, a FOV 156 of an optical component of an optical system. An "line of sight", for the purposes of this disclosure, is a line along which an observer or lens has unobstructed vision. A "field of view", for the purposes of this disclosure, is an angle through and/or an area within which an optical component detects electromagnetic radiation. For instance, and without limitation, FOV may indicate an area of a scene that may be captured by an optical component within defined bounds (e.g., a frame) of an image. For example, and without limitation, area of interest 128 within FOV 156 of optical system 120 may include a scene desired to be captured in an image by being placed within a line of sight of a lens of optimal system 120, so that image may be captured. FOV 156 may include vertical and horizontal angles that project relative to the surface of a lens of an optical component. In one or more embodiments, line of sight may include an optical access of the FOV. In various embodiments, an area of interest 128 may include at least a portion of specimen 112. In some embodiments, an area of interest may include a portion of specimen 112 and a portion of slide 116.

Still referring to FIG. 1A, in one or more embodiments, image may include image data. As used in this disclosure, "image data" is information representing at least a physical scene, space, and/or object. Image data may include, for example, information representing a sample, slide 116, or region of a sample or slide. In some cases, image data may be generated by a camera. "Image data" may be used interchangeably through this disclosure with "image," where image is used as a noun. An image may be optical, such as without limitation where at least an optic is used to generate an image of an object. An image may be digital, such as without limitation when represented as a bitmap. Alternatively, an image may be comprised of any media capable of representing a physical scene, space, and/or object. Alternatively, where "image" is used as a verb, in this disclosure, it refers to generation and/or formation of an image.

Still referring to FIG. 1A, in some embodiments, imaging device 100 may include a slide port 144. In some embodiments, slide port 144 may be configured to hold slide 116. In some embodiments, slide port 144 may include one or more alignment features. As used herein, an "alignment feature" is a physical feature that helps to secure a slide in place and/or align a slide with another component of an imaging device. In some embodiments, alignment feature may include a component which keeps slide 116 secure, such as a clamp, latch, clip, recessed area, or another fastener. In some embodiments, slide port 144 may allow for easy removal or insertion of slide 116. In some embodiments, slide port 144 may include a transparent surface through which light may travel. In some embodiments, slide 116 may rest on and/or may be illuminated by light traveling through such a transparent surface. In some embodiments, slide port 144 may be mechanically connected to an actuator mechanism 124 as described below.

Still referring to FIG. 1A, in some embodiments, imaging device 100 may include an actuator mechanism 124. As used herein, an "actuator mechanism" is a mechanical component configured to change the position of a slide relative to an optical system. In one or more embodiments, actuator mechanism may be used to alter line of sight so that an image of a new area of interest (e.g., a second area of interest) may be captured, as discussed further in this disclosure. In some embodiments, actuator mechanism 124 may be mechanically connected to slide 116, such as slide 116 in slide port 144. In some embodiments, actuator mechanism 124 may be mechanically connected to slide port 144. For example, actuator mechanism 124 may move slide port 144 in order to move slide 116. For example, and without limitation, actuator mechanism 124 may move slide port 144 so that a distance D between a top surface of slide 116 and a lens of optical system 120 varies. In other embodiments, actuator mechanism 124 may also vary an angle between top surface (e.g., surface directed toward, or facing, optical system and that the specimen contacts) and lens. In some embodiments, actuator mechanism 124 may be mechanically connected to at least an optical system 120. In some embodiments, actuator mechanism 124 may be mechanically connected to a mobile element. As used in this disclosure, a "mobile element" refers to any movable or portable object, component, and device within imaging device 100 such as, without limitation, a slide, a slide port, or an optical system. In some embodiments, a mobile element may move such that optical system 120 is positioned correctly with respect to slide 116 such that optical system 120 may capture an image of slide 116 according to a parameter set. In some embodiments, actuator mechanism 124 may be mechanically connected to an item selected from the list consisting of slide port 144, slide 116, and at least an optical system 120. In some embodiments, actuator mechanism 124 may be configured to change the relative position of slide 116 and optical system 120 by moving slide port 144, slide 116, and/or optical system 120.

Still referring to FIG. 1A, actuator mechanism 124 may include a component of a machine that is responsible for moving and/or controlling a mechanism or system. Actuator mechanism 124 may, in some embodiments, require a control signal and/or a source of energy or power. In some cases, a control signal may be relatively low energy. Exemplary control signal forms include electric potential or current, pneumatic pressure or flow, or hydraulic fluid pressure or flow, mechanical force/torque or velocity, or even human power. In some cases, an actuator may have an energy or power source other than control signal. This may include a main energy source, which may include for example electric power, hydraulic power, pneumatic power, mechanical power, and the like. In some embodiments, upon receiving a control signal, actuator mechanism 124 responds by converting source power into mechanical motion. In some cases, actuator mechanism 124 may be understood as a form of automation or automatic control.

Still referring to FIG. 1A, in some embodiments, actuator mechanism 124 may include a hydraulic actuator. A hydraulic actuator may consist of a cylinder or fluid motor that uses hydraulic power to facilitate mechanical operation. Output of hydraulic actuator mechanism 124 may include mechanical motion, such as without limitation linear, rotatory, or oscillatory motion. In some embodiments, hydraulic actuator may employ a liquid hydraulic fluid. As liquids, in some cases, are incompressible, a hydraulic actuator can exert large forces. Additionally, as force is equal to pressure multiplied by area, hydraulic actuators may act as force transformers with changes in area (e.g., cross sectional area of cylinder and/or piston). An exemplary hydraulic cylinder may consist of a hollow cylindrical tube within which a piston can slide. In some cases, a hydraulic cylinder may be considered single acting. "Single acting" may be used when fluid pressure is applied substantially to just one side of a piston. Consequently, a single acting piston can move in only one direction. In some cases, a spring may be used to give a single acting piston a return stroke. In some cases, a hydraulic cylinder may be double acting. "Double acting" may be used when pressure is applied substantially on each side of a piston; any difference in resultant force between the two sides of the piston causes the piston to move.

Still referring to FIG. 1A, in some embodiments, actuator mechanism 124 may include a pneumatic actuator mechanism. In some cases, a pneumatic actuator may enable considerable forces to be produced from relatively small changes in gas pressure. In some cases, a pneumatic actuator may respond more quickly than other types of actuators such as, for example, hydraulic actuators. A pneumatic actuator may use compressible fluid (e.g., air). In some cases, a pneumatic actuator may operate on compressed air. Operation of hydraulic and/or pneumatic actuators may include control of one or more valves, circuits, fluid pumps, and/or fluid manifolds.

Still referring to FIG. 1A, in some cases, actuator mechanism 124 may include an electric actuator. Electric actuator mechanism 124 may include any of electromechanical actuators, linear motors, and the like. In some cases, actuator mechanism 124 may include an electromechanical actuator. An electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, and the like. In some cases, control of an electromechanical actuator may include control of electric motor, for instance a control signal may control one or more electric motor parameters to control electromechanical actuator. Exemplary non-limitation electric motor parameters include rotational position, input torque, velocity, current, and potential. Electric actuator mechanism 124 may include a linear motor. Linear motors may differ from electromechanical actuators, as power from linear motors is output directly as translational motion, rather than output as rotational motion and converted to translational motion. In some cases, a linear motor may cause lower friction losses than other devices. Linear motors may be further specified into at least 3 different categories, including flat linear motor, U-channel linear motors and tubular linear motors. Linear motors may be directly controlled by a control signal for controlling one or more linear motor parameters. Exemplary linear motor parameters include without limitation position, force, velocity, potential, and current.

Still referring to FIG. 1A, in some embodiments, an actuator mechanism 124 may include a mechanical actuator mechanism 124. In some cases, a mechanical actuator mechanism 124 may function to execute movement by converting one kind of motion, such as rotary motion, into another kind, such as linear motion. An exemplary mechanical actuator includes a rack and pinion. In some cases, a mechanical power source, such as a power take off may serve as power source for a mechanical actuator. Mechanical actuators may employ any number of mechanisms, including for example without limitation gears, rails, pulleys, cables, linkages, and the like.

Still referring to FIG. 1A, in some embodiments, actuator mechanism 124 may be in electronic communication with actuator controls. As used herein, "actuator controls" is a system configured to operate actuator mechanism such that a slide and an optical system reach a desired relative position. In some embodiments, actuator controls may operate actuator mechanism 124 based on input received from a user interface. In some embodiments, actuator controls may be configured to operate actuator mechanism 124 such that optical system 120 is in a position to capture an image of an entire sample. In some embodiments, actuator controls may be configured to operate actuator mechanism 124 such that optical system 120 is in a position to capture an image of a region of interest. As used in this disclosure, a "region of interest" (also referred to herein as an "area of interest") is a specific area within a digital image, or a specific area within a slide. In some embodiments, a region of interest may include a region selected by a user or navigated to by a user. Electronic communication between actuator mechanism 124 and actuator controls may include transmission of signals. For example, actuator controls may generate physical movements of actuator mechanism in response to an input signal. In some embodiments, input signal may be received by actuator controls from processor 104 or input interface.

Still referring to FIG. 1A, as used in this disclosure, a "signal" is any intelligible representation of data, for example from one device to another. A signal may include an optical signal, a hydraulic signal, a pneumatic signal, a mechanical signal, an electric signal, a digital signal, an analog signal, and the like. In one or more embodiments, image data may be transmitted through one or more signals. In other embodiments, instructions from an operator of imaging device 100 may send commands to a component of imaging device, such as optical system, through one or more signals. In some cases, a signal may be used to communicate with a computing device, for example, by way of one or more ports. In some cases, a signal may be transmitted and/or received by a computing device, for example by way of an input/output port. An analog signal may be digitized, for example by way of an analog to digital converter. In some cases, an analog signal may be processed, for example by way of any analog signal processing steps described in this disclosure, prior to digitization. In some cases, a digital signal may be used to communicate between two or more devices, including without limitation computing devices. In some cases, a digital signal may be communicated by way of one or more communication protocols, including without limitation internet protocol (IP), controller area network (CAN) protocols, serial communication protocols (e.g., universal asynchronous receiver-transmitter [UART]), parallel communication protocols (e.g., IEEE [printer port]), and the like.

Still referring to FIG. 1A, in some embodiments, imaging device 100 may perform one or more signal processing steps on a signal. For instance, imaging device 100 may analyze, modify, and/or synthesize a signal representative of data in order to improve the signal, for instance by improving transmission, storage efficiency, or signal to noise ratio. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which vary continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

Still referring to FIG. 1A, in some embodiments, imaging device 100 may include a user interface, as previously described in this disclosure. User interface may include output interface and input interface. In some embodiments, output interface may include one or more elements through which imaging device 100 may communicate information to a user. In a non-limiting example, output interface may include a display. A display may include a high-resolution display. A display may output images, videos, and the like to a user. In another non-limiting example, output interface may include a speaker. A speaker may output audio to a user.

In another non-limiting example, output interface may include a haptic device. A speaker may output haptic feedback to a user.

Still referring to FIG. 1A, in some embodiments, input interface may include controls for operating imaging device 100. Such controls may be operated by a user. Input interface may include, in non-limiting examples, a camera, microphone, keyboard, touch screen, mouse, joystick, foot pedal, button, dial, and the like. Input interface may accept, in non-limiting examples, mechanical input, audio input, visual input, text input, and the like. In some embodiments, audio inputs into input interface may be interpreted using an automatic speech recognition function, allowing a user to control imaging device 100 via speech. In some embodiments, input interface may approximate controls of a microscope.

Still referring to FIG. 1A, in one or more embodiments, imaging device 100 may be configured to create multi-layer scan, where the multi-layer scan includes a plurality, such as a series, of images combined into a single image. A multi-layer scan may include an integrated image. For instance, and without limitation, multi-layer scan includes a compilation of consecutive images taken at different levels along a z-axis, or depth axis, at a particular location (x, y) of a specimen. For instance, and without limitation, multi-layer scan may include a plurality of images including an image taken with a focus depth A, an image taken with a focus depth B, and image taken with a focus depth C, and so on, as discussed further below.

Now referring to FIG. 1A, in various embodiments, imaging device 100 may receive one or more parameters from an operator of imaging device 100. One or more parameters may include a plurality of parameters (also referred to herein as a "parameter set"). As used in this disclosure, a "parameter set" is a set of values, such as without limitation quantitative and/or numerical values, that identify how an image is to be captured. Parameter set may be implemented as a data structure, as described below. In some embodiments, imaging device 100 may receive a parameter set from an operator using input interface. Parameter set may include x and y coordinates indicating a location on specimen that operator wishes to view (e.g., area of interest 128). For instance, and without limitation, imaging device 100 may receive parameters, such as a first location x associated with a first area of interest 128a and a second location x' associated with a second area of interest 128b (shown in FIG. 1B) from user input, database, or other means described in this disclosure. For instance, and without limitation, using user interface, operator may select first location x and second location x' as parameters based on a field of vision (e.g., field of view) of optical component. In other embodiments, a trained machine-learning model, such as the machine-learning model described in FIG. 2, may be used to determine first location x and second location x'. For example, and without limitation, first location x and second location x' may be determined using a field of vision required to cover a sample or a determination of items to be captured in the sample (e.g., specimen 112). Parameter set may include a desired focus depth and level of zoom. For the purposes of this disclosure, a "focus depth" (also referred to herein as a "depth of focus") is a distance between a lens, series of lenses, focal mirror, and/or series of focal mirrors and an image sensor of optical system to achieve a specific focal point. As used in this disclosure, a "level of zoom" is a data related to a magnification of a region within a line of sight of an optical system. For instance, and without limitation, level of zoom may include a magnification of an area of interest within line of sight. A level of zoom may include optical zoom and/or digital zoom. As a non-limiting example, a level of zoom may be "8×" zoom. Parameter set may include a desired focus depth, as mentioned in this disclosure. In a non-limiting example, operator may manipulate input interface and/or imaging device 100 such that a parameter set includes x and y coordinates and a level of zoom corresponding to a more zoomed in view of a particular region of a sample. In some embodiments, parameter set corresponds to a more zoomed in view of a particular region of a sample that is included in first image. This may be done, for example, to get a more detailed view of at least a portion of specimen 112. As used in this disclosure, unless indicated otherwise, an "x coordinate" and a "y coordinate" refer to coordinates along perpendicular axes, where the plane defined by these axes is parallel to a plane of a surface of slide 116. In some cases, setting a level of zoom may include changing one or more optical elements of optical system 120. For example, and without limitation, setting a level of zoom may include replacing a first objective lens with a second objective lens having a different magnification. Additionally or alternative, one or more optical components "down beam" from objective lens may be replaced to change a total magnification of optical system and, thereby, set level of zoom. In some cases, setting level of zoom may include changing a digital magnification. Digital magnification may include outputting an image, using output interface, at a different resolution, i.e. after re-scaling the image.

Still referring to FIG. 1B, in some embodiments, imaging device 100 may be configured to determine one or more parameters of a first multi-layer scan 140a (also referred to herein as a "integrated image") at first location x of specimen 112. First multi-layer scan 140a may include a plurality of first images 136a-e related to a first area of interest 128a of specimen 112 at first location x. For instance, and without limitation, first multi-layer scan 140a may include a first area of interest 128a out of a plurality of areas of interest 128a-c. In one or more embodiments, processor 104 of imaging device 100 may be configured to determine one or more parameters of first multi-layer scan 140a at first location x of specimen 112. In one or more embodiments, multi-layer scan may include a plurality of images, as shown in FIG. 1B. In one or more embodiments, parameters may include measurable factors and/or conditions for taking an image of a desired location of a specimen. Parameters of multi-layer scan may include a quantity of layers (e.g., one or more layers), each at a different focal plane and/or focal point of focal plane. A quantity of layers may include a plurality of layers and/or images. In a non-limiting exemplary embodiment, parameters of multi-layer scan 140a may include a first image 136a at a focal point A taken at a first location x as a first layer, a second image 136b at a focal point B as a second layer, a third image 136c at a focal point C as a third layer, a fourth image 136d at a focal point D as a fourth layer, a fifth image 136e at a focal point E as a fifth layer, and so on. In some embodiments, focal points are evenly spaced. In other embodiments, focal points may be various distanced from each other. Parameters of multi-layer scan may also include a size of each of layers and/or images. For instance, and without limitation, a size of each layer and/or image may include dimensions (units) of area of interest of specimen 112. Parameters of multi-layer scan may also include a quantity of layers, as previously mentioned. In one or more embodiments, each image may be dynamically capture, where images may include videos over a duration of time (e.g., temporal parameter).

Still referring to FIG. 1B, in some embodiments, determining one or more parameters of first multi-layer scan 140a at first location x of specimen 112 may include determining a count metric of first multi-image scan 140a. For the purposes of this disclosure, a "count metric" is a parameter related to a quantity. Count metric may include a quantity of layers, or images at varying depths, to be included in the multi-layer scan, such as plurality of images. In some embodiments, processor 104 may receive one or more count metrics from operator. In other embodiments, processor 104 may determine count metrics. In one or more embodiments, the quantity of layers may be identified by estimating a depth (e.g., thickness) of specimen 112. In one or more non-limiting embodiments, depth of specimen 112 may be identified by subtracting a thickness Ts of slide 116 that specimen is disposed on and a thickness Tc of a coverslip from the combined thickness TT of the slide and the cover slip, i.e., Ds=TT−(Ts+Tc). The depth Ds of the specimen may then be divided into spacings (i.e. steps per layer) at specific depths of field and objectives. In some embodiments, each image of the plurality of images may have a different focal point. The focus distance between each image may be controlled using imaging device, using, for example, a motor to horizontally and/or vertically move slide relative to a lens of the imaging device, such as actuator mechanism 124. In other embodiments, detecting one or more parameters may include detecting a thickness t of specimen at an area of interest. For instance, and without limitation, a light sensor, pressure sensor, infrared sensor, and the like may be used to determine a height or thickness of specimen 112 at any location along specimen 112.

Still referring to FIG. 1B, determining one or more parameters of first multi-layer scan 140a at first location x of specimen 112 may include determining a focus metric of each layer of the first multi-layer scan. A focal point, such as focal points A, B, C, D, and E of FIG. 1B, may be determined as a function of focus metrics. Focal point may be adjusted by moving specimen 112 relative to the lens of the imaging device along a z-axis, such as for example, using actuator mechanism 124. Focus metrics of each layer may be determined based on creating focus planes where at least a portion of specimen 112 is in focus in a chosen focus plane.

Still referring to FIG. 1B, in one or more embodiments, imaging device 100 may be configured to capture a first plurality of images 136 of specimen at a first location x. In various embodiments, optical system 120 may capture at least a first image 136a of specimen 112 at a first location x of specimen 112 of a first area of interest 128a. For instance, and without limitation, optical system 120 may capture first plurality of images 136 of first area of interest 128a while first area of interest 128a is positioned within line of sight 132 of optical system 120. In some embodiments, capturing first plurality of images 136a of first area of interest 128a while slide 116 is in a first position may include using actuator mechanism 124 and/or actuator controls to move optical system 120 and/or slide 116 into a desired position. Desired position may include a location and/or orientation of slide 116 and/or specimen 112 within a space defined by, for example and without limitation, a Cartesian coordinate system (x, y, z), polar coordinate system (r, θ), cylindrical coordinate system (ρ, φ, z), or spherical coordinate system (r, θ, φ). In some embodiments, each image 136a-e of first plurality of images may include an image of the entire sample and/or the entire slide 116. In other embodiments, each image 136a-e of first plurality of images may include an image of a region of a sample. In some embodiments, one image of first plurality of images may include a wider angle image another image of first plurality of images. In some embodiments, one image of first plurality of images may include a lower resolution image than another image. In some embodiments, a machine vision system and/or an optical character recognition system may be used to determine one or more features of sample and/or slide 116. Such feature determinations may be used to, for example, remove artifacts from images and/or annotate images as described below. In a non-limiting example, an optical character recognition system may be used to identify writing on slide 116, and this may be used to annotate an image of slide 116. In another non-limiting example, a machine vision system may be used to detect dust particles in a slide 116, and an artifact removal machine-learning model (described below) may remove the dust particles from the image.

Still referring to FIG. 1B, first plurality of images 136 may include one or more images 136a-e of the same x and y coordinates at differing focus depths along the z-axis. As used in this disclosure, a "focus depth" is a depth at which at least a portion of specimen is in focus for optical system. Focus depth may include the depth at which a specific focal point is achieved. As used in this disclosure, a "focus distance" is a distance f from optical system at which optical sensor is in focus. For instance, and without limitation, first image 136a and second image 136b of first plurality of images 136 may have different focus distances and/or focus depths. In some embodiments, such images may be stored as a plurality of layers of a multi-layer scan. For example, and without limitation, each image may include a layer of first plurality of images corresponding with a particular focus depth. In some embodiments, an operator may be able to navigate between layers using a user interface, such as a user interface of a computing system or remote device communicatively connected to processor 104 and memory 108. In a non-limiting example, this may be implemented by displaying to a user a focus depth selection menu. In this example, user may select a first focus depth, and an image taken at first focus depth may be displayed. In this example, an operator may then select a second focus depth, and an image taken at second focus depth may be displayed. In some embodiments, imaging device 100 may capture images at a particular focus depth upon selection of that focus depth by a user.

Still referring to FIG. 1B, in one or more embodiments, imaging device 100 may be configured to compile first plurality of images 136 into a first integrated image 140a. For the purposes of this disclosure, an "integrated image" is a processed multi-layer scan composed of a plurality of images taken at various focus depths. In one or more embodiments, multi-layer scan may include a plurality of overlayed images. For instance, and without limitation, plurality of images 136a-e captured at first location x may be consolidated to create first integrated image 140a. In one or more embodiments, integrated image may include an extended field of depth (EFOD) image. In one or more embodiments, first plurality of images 138a-e may be compiled together to create first integrate image 140a using an image processing module of imaging device 100.

With continued reference to FIG. 1B, imaging device 100 may combine first plurality of images 136 by registering pixels to one another. For instance, and without limitation, processor 104 of imaging device 100 may determine which pixels in each image 136a-e are associated so that each image 136a-e of the first plurality of images 136 may be adjusted accordingly (e.g., each pixel of images 136a-e are aligned or have similar treatment, such as chroma, luma, white balance, or other values).

With continued reference to FIG. 1B, imaging device 100 may combine first plurality of images 136 through image fusion. As used in this disclosure, "image fusion" is a process of gathering important information from multiple images into fewer, usually one image. One method of image fusion includes multi-focus image fusion. As used in this disclosure, "multi-focus image fusion" is image fusion process that combines input images having different focus depths to create at least an output image comprising at focus image data from the input images. According to some embodiments, multi-focus image fusion may include selection of at focus image data from multiple input images. Determination of at focus image data may be performed on a per pixel basis, for example according to one or more image fusion metrics. Generally, image fusion may be categorized according to two categories: transform and spatial domains. Commonly used transforms for image fusion are Discrete cosine transform (DCT) and Multi-Scale Transform (MST). In some cases, image fusion may be based on MST. Exemplary MST methods include Laplacian pyramid transform, gradient pyramid-based transform, morphological pyramid transform and the premier ones, discrete wavelet transform, shift-invariant wavelet transform (SIDWT), and discrete cosine harmonic wavelet transform (DCHWT). In some cases, DCT-based methods may be more efficient in terms of transmission and archiving images compared with MST. In some cases, DCT may be employed on images encoded in Joint Photographic Experts Group (JPEG). A JPEG system consists of a pair of an encoder and a decoder. In the encoder, images are divided into non-overlapping 8×8 blocks, and the DCT coefficients are calculated for each. Since the quantization of DCT coefficients is a lossy process, many of the small-valued DCT coefficients are quantized to zero, which corresponds to high frequencies. DCT-based image fusion algorithms work better when the multi-focus image fusion methods are applied in the compressed domain. In some cases, DCT domain-based image fusion methods do not require consecutive decoding and encoding operations. Exemplary DCT image fusion processes include DCT+Variance, DCT+Corr_Eng, DCT+EOL, and DCT+VOL. Image fusion methods may additionally or alternatively include processes in the spatial domain. Image fusion may employ determination and use of focus measurements including variance, energy of image gradient (EOG), Tenenbaum's algorithm (Tenengrad), energy of Laplacian (EOL), sum-modified-Laplacian (SML), and spatial frequency (SF). Image fusion may include aggregating in focus regions from multiple input images into an image. In some cases, boundaries, either at an edge of an image or between regions having different in focus input images may be processed differently. For instance, in some cases, section of an image at a boundary between two (or more) in focus images may be processed as a weighted average of values from the two (or more) nearest in focus images. In some cases, machine learning may be used to aid in image fusion processes.

Figure 2:
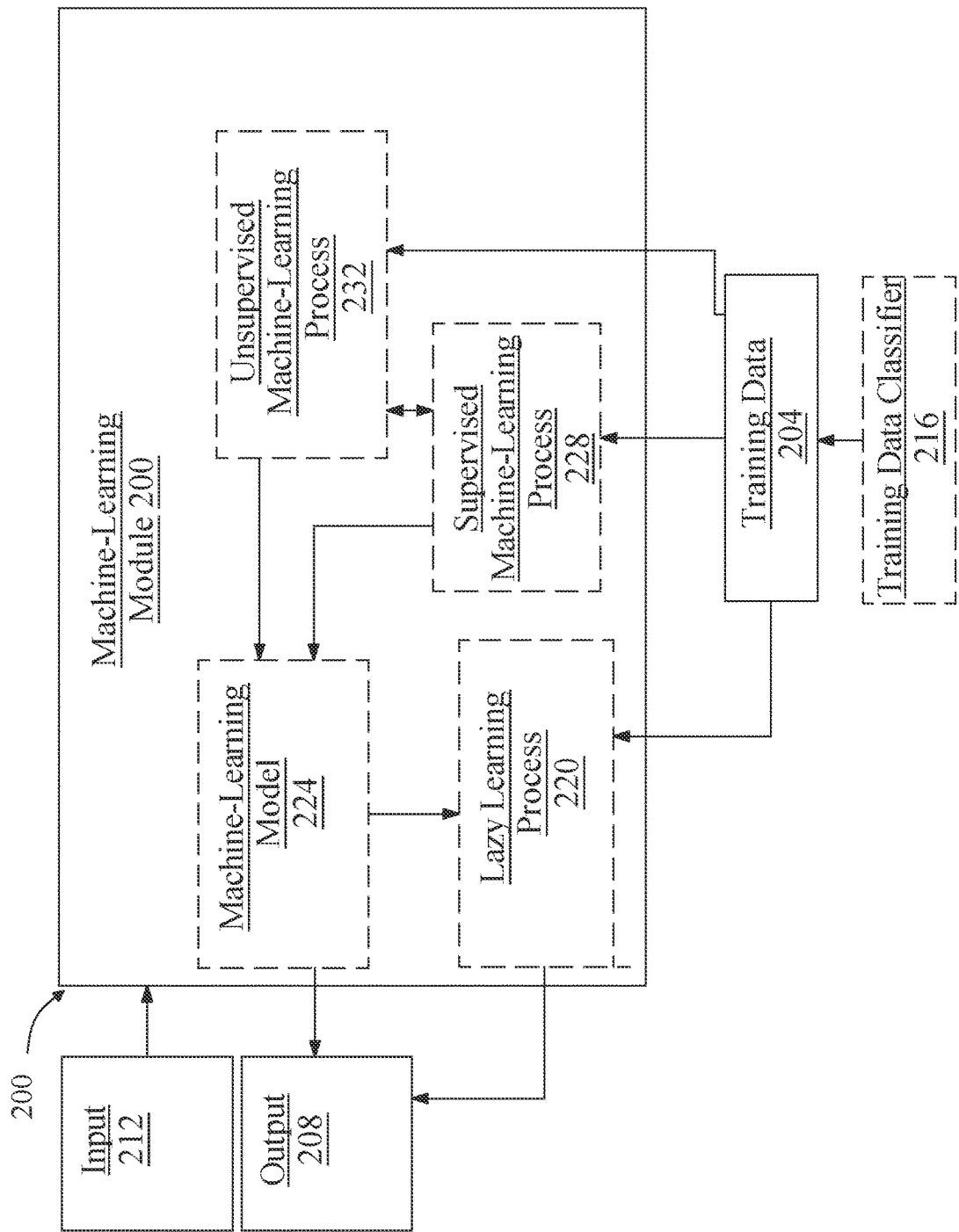
FIG. 2 is a block diagram of an exemplary embodiment of a machine-learning process in accordance with one or more embodiments of the present disclosure.

With continued reference to FIG. 1B, imaging device 100 may combine first plurality of images 136 using a machine learning model, such as the machine-learning model described in FIG. 2. training a machine-learning model such as without limitation a convolutional neural net, deep neural net or some combination thereof to generate an integrated image given two or more images as inputs. Two-image input could be done iteratively with one or both of the two images a previous output of the neural network.

With continued reference to FIG. 1B, imaging device 100 may include an image processing module. As used in this disclosure, an "image processing module" is a component designed to process digital images. For example, and without limitation, image processing, module may be configured to compile plurality of images of a multi-layer scan to create an integrated image. In an embodiment, image processing module may include a plurality of software algorithms that can analyze, manipulate, or otherwise enhance an image, such as, without limitation, a plurality of image processing techniques as described below. In another embodiment, image processing module may slow include hardware components such as, without limitation, one or more graphics processing units (GPUs) that can accelerate the processing of large amount of images. In some cases, image processing module may be implemented with one or more image processing libraries such as, without limitation, OpenCV, PIL/Pillow, ImageMagick, and the like. Image processing module may include, be included in, or be communicatively connected to optical system 120, processor 104, and/or memory 108.

Still referring to FIG. 1B, image processing module may be configured to receive images from optical system 120. In a non-limiting example, image processing module may be configured to receive images by generating a first image capture parameter, transmitting a command to optical system to take first image of a plurality of images with the first image capture parameter, generate a second image capture parameter, transmit a command to optical system to take second image of a plurality of images with the second image capture parameter, and receive, from optical system, first image and second image. In another non-limiting example, plurality of images may be taken by optical system using the same image capture parameter. Image capture parameter may be generated as a function of user input or processor 104.

Still referring to FIG. 1B, plurality of images may be transmitted from optical system 120 to image processing module via any suitable electronic communication protocol, including without limitation packet-based protocols such as transfer control protocol-internet protocol (TCP-IP), file transfer protocol (FTP) or the like. Receiving images may include retrieval of images from a data store containing images as described below; for instance, and without limitation, images may be retrieved using a query that specifies a timestamp that images may be required to match.

Still referring to FIG. 1B, image processing module may be configured to process images. In an embodiment, image processing module may be configured to compress and/or encode images to reduce the file size and storage requirements while maintaining the essential visual information needed for further processing steps as described below. In an embodiment, compression and/or encoding of plurality of images may facilitate faster transmission of images. In some cases, image processing module may be configured to perform a lossless compression on images, wherein the lossless compression may maintain the original image quality of images. In a non-limiting example, image processing module may utilize one or more lossless compression algorithms, such as, without limitation, Huffman coding, Lempel-Ziv-Welch (LZW), Run-Length Encoding (RLE), and/or the like to identify and remove redundancy in each image in a plurality of images without losing any information. In such embodiment, compressing and/or encoding each image of a plurality of images may include converting the file format of each image into PNG, GIF, lossless JPEG2000 or the like. In an embodiment, images compressed via lossless compression may be perfectly reconstructed to the original form (e.g., original image resolution, dimension, color representation, format, and the like) of images. In other cases, image processing module may be configured to perform a lossy compression on plurality of images, wherein the lossy compression may sacrifice some image quality of images to achieve higher compression ratios. In a non-limiting example, image processing module may utilize one or more lossy compression algorithms, such as, without limitation, Discrete Cosine Transform (DCT) in JPEG or Wavelet Transform in JPEG2000, discard some less significant information within images, resulting in a smaller file size but a slight loss of image quality of images. In such embodiment, compressing and/or encoding each image of a plurality of images may include converting the file format of each image into JPEG, WebP, lossy JPEG2000, or the like.

Still referring to FIG. 1B, in an embodiment, processing images may include determining a degree of quality of depiction of a region of interest of an image or a plurality of images. In an embodiment, image processing module may determine a degree of blurriness of images. In a non-limiting example, image processing module may perform a blur detection by taking a Fourier transform, or an approximation such as a Fast Fourier Transform (FFT) of images and analyzing a distribution of low and high frequencies in the resulting frequency-domain depiction of images; for instance, and without limitation, numbers of high-frequency values below a threshold level may indicate blurriness. In another non-limiting example, detection of blurriness may be performed by convolving images, a channel of images, or the like with a Laplacian kernel; for instance, and without limitation, this may generate a numerical score reflecting a number of rapid changes in intensity shown in each image, such that a high score indicates clarity and a low score indicates blurriness. In some cases, blurriness detection may be performed using a Gradient-based operator, which measures operators based on the gradient or first derivative of images, based on the hypothesis that rapid changes indicate sharp edges in the image, and thus are indicative of a lower degree of blurriness. In some cases, blur detection may be performed using Wavelet-based operator, which takes advantage of the capability of coefficients of the discrete wavelet transform to describe the frequency and spatial content of images. In some cases, blur detection may be performed using statistics-based operators take advantage of several image statistics as texture descriptors in order to compute a focus level. In other cases, blur detection may be performed by using discrete cosine transform (DCT) coefficients in order to compute a focus level of images from its frequency content. Additionally, or alternatively, image processing module may be configured to rank images according to degree of quality of depiction of a region of interest and select a highest-ranking image from a plurality of images.

Still referring to FIG. 1B, processing images may include enhancing at least a region of interest via a plurality of image processing techniques to improve the quality (or degree of quality of depiction) of an image for better processing and analysis as described further in this disclosure. In an embodiment, image processing module may be configured to perform a noise reduction operation on an image, wherein the noise reduction operation may remove or minimize noise (arises from various sources, such as sensor limitations, poor lighting conditions, image compression, and/or the like), resulting in a cleaner and more visually coherent image. In some cases, noise reduction operation may be performed using one or more image filters; for instance, and without limitation, noise reduction operation may include Gaussian filtering, median filtering, bilateral filtering, and/or the like. Noise reduction operation may be done by image processing module, by averaging or filtering out pixel values in neighborhood of each pixel of an image to reduce random variations.

Still referring to FIG. 1B, in another embodiment, image processing module may be configured to perform a contrast enhancement operation on an image. In some cases, an image may exhibit low contrast, which may, for example, make a feature difficult to distinguish from the background. Contrast enhancement operation may improve the contrast of an image by stretching the intensity range of the image and/or redistributing the intensity values (i.e., degree of brightness or darkness of a pixel in the image). In a non-limiting example, intensity value may represent the gray level or color of each pixel, scale from 0 to 255 in intensity range for an 8-bit image, and scale from 0 to 16,777,215 in a 24-bit color image. In some cases, contrast enhancement operation may include, without limitation, histogram equalization, adaptive histogram equalization (CLAHE), contrast stretching, and/or the like. Image processing module may be configured to adjust the brightness and darkness levels within an image to make a feature more distinguishable (i.e., increase degree of quality of depiction). Additionally, or alternatively, image processing module may be configured to perform a brightness normalization operation to correct variations in lighting conditions (i.e., uneven brightness levels). In some cases, an image may include a consistent brightness level across a region after brightness normalization operation performed by image processing module. In a non-limiting example, image processing module may perform a global or local mean normalization, where the average intensity value of an entire image or region of an image may be calculated and used to adjust the brightness levels.

Still referring to FIG. 1B, in other embodiments, image processing module may be configured to perform a color space conversion operation to increase degree of quality of depiction. In a non-limiting example, in case of a color image (i.e., RGB image), image processing module may be configured to convert RGB image to grayscale or HSV color space. Such conversion may emphasize the differences in intensity values between a region or feature of interest and the background. Image processing module may further be configured to perform an image sharpening operation such as, without limitation, unsharp masking, Laplacian sharpening, high-pass filtering, and/or the like. Image processing module may use image sharpening operation to enhance the edges and fine details related to a region or feature of interest within an image by emphasizing high-frequency components within an image.

Still referring to FIG. 1B, processing images may include isolating a region or feature of interest from the rest of an image as a function of plurality of image processing techniques. Images may include highest-ranking image selected by image processing module as described above. In an embodiment, plurality of image processing techniques may include one or more morphological operations, wherein the morphological operations are techniques developed based on set theory, lattice theory, topology, and random functions used for processing geometrical structures using a structuring element. A "structuring element," for the purpose of this disclosure, is a small matrix or kernel that defines a shape and size of a morphological operation. In some cases, structuring element may be centered at each pixel of an image and used to determine an output pixel value for that location. In a non-limiting example, isolating a region or feature of interest from an image may include applying a dilation operation, wherein the dilation operation is a basic morphological operation configured to expand or grow the boundaries of objects (e.g., a cell, a dust particle, and the like) in an image. In another non-limiting example, isolating a region or feature of interest from an image may include applying an erosion operation, wherein the erosion operation is a basic morphological operation configured to shrink or erode the boundaries of objects in an image. In another non-limiting example, isolating a region or feature of interest from an image may include applying an opening operation, wherein the opening operation is a basic morphological operation configured to remove small objects or thin structures from an image while preserving larger structures. In a further non-limiting example, isolating a region or feature of interest from an image may include applying a closing operation, wherein the closing operation is a basic morphological operation configured to fill in small gaps or holes in objects in an image while preserving the overall shape and size of the objects. These morphological operations may be performed by image processing module to enhance the edges of objects, remove noise, or fill gaps in a region or feature of interest before further processing.

Still referring to FIG. 1B, in an embodiment, isolating a region or feature of interest from an image may include utilizing an edge detection technique, which may detect one or more shapes defined by edges. An "edge detection technique," as used in this disclosure, includes a mathematical method that identifies points in a digital image, at which the image brightness changes sharply and/or has a discontinuity. In an embodiment, such points may be organized into straight and/or curved line segments, which may be referred to as "edges." Edge detection technique may be performed by image processing module, using any suitable edge detection algorithm, including without limitation Canny edge detection, Sobel operator edge detection, Prewitt operator edge detection, Laplacian operator edge detection, and/or Differential edge detection. Edge detection technique may include phase congruency-based edge detection, which finds all locations of an image where all sinusoids in the frequency domain, for instance as generated using a Fourier decomposition, may have matching phases which may indicate a location of an edge. Edge detection technique may be used to detect a shape of a feature of interest such as a cell, indicating a cell membrane or wall; in an embodiment, edge detection technique may be used to find closed figures formed by edges.

Still referring to FIG. 1B, in a non-limiting example, isolating a feature of interest from an image may include determining a feature of interest via edge detection technique. A feature of interest may include a specific area within a digital image that contains information relevant to further processing as described below. In a non-limiting example, an image data located outside a feature of interest may include irrelevant or extraneous information. Such portion of an image containing irrelevant or extraneous information may be disregarded by image processing module, thereby allowing resources to be concentrated at a feature of interest. In some cases, feature of interest may vary in size, shape, and/or location within an image. In a non-limiting example feature of interest may be presented as a circle around the nucleus of a cell. In some cases, feature of interest may specify one or more coordinates, distances and the like, such as center and radius of a circle around the nucleus of a cell in an image. Image processing module may then be configured to isolate feature of interest from the image based on feature of interest. In a non-limiting example, image processing module may crop an image according to a bounding box around a feature of interest.

Still referring to FIG. 1B, image processing module may be configured to perform a connected component analysis (CCA) on an image for feature of interest isolation. As used in this disclosure, a "connected component analysis (CCA)," also known as connected component labeling, is an image processing technique used to identify and label connected regions within a binary image (i.e., an image which each pixel having only two possible values: 0 or 1, black or white, or foreground and background). "Connected regions," as described herein, is a group of adjacent pixels that share the same value and are connected based on a predefined neighborhood system such as, without limitation, 4-connected or 8-connected neighborhoods. In some cases, image processing module may convert an image into a binary image via a thresholding process, wherein the thresholding process may involve setting a threshold value that separates the pixels of an image corresponding to feature of interest (foreground) from those corresponding to the background. Pixels with intensity values above the threshold may be set to 1 (white) and those below the threshold may be set to 0 (black). In an embodiment, CCA may be employed to detect and extract feature of interest by identifying a plurality of connected regions that exhibit specific properties or characteristics of the feature of interest. Image processing module may then filter plurality of connected regions by analyzing plurality of connected regions properties such as, without limitation, area, aspect ratio, height, width, perimeter, and/or the like. In a non-limiting example, connected components that closely resemble the dimensions and aspect ratio of feature of interest may be retained, by image processing module as feature of interest, while other components may be discarded. Image processing module may be further configured to extract feature of interest from an image for further processing as described below.

Still referring to FIG. 1B, in an embodiment, isolating feature of interest from an image may include segmenting a region depicting a feature of interest into a plurality sub-regions. Segmenting a region into sub-regions may include segmenting a region as a function of feature of interest and/or CCA via an image segmentation process. As used in this disclosure, an "image segmentation process" is a process for partition a digital image into one or more segments, where each segment represents a distinct part of the image. Image segmentation process may change the representation of images. Image segmentation process may be performed by image processing module. In a non-limiting example, image processing module may perform a region-based segmentation, wherein the region-based segmentation involves growing regions from one or more seed points or pixels on an image based on a similarity criterion. Similarity criterion may include, without limitation, color, intensity, texture, and/or the like. In a non-limiting example, region-based segmentation may include region growing, region merging, watershed algorithms, and the like.

Still referring to FIG. 1B, in some embodiments, imaging device 100 may remove an artifact identified by machine vision system or an optical character recognition system, which are described above. Non-limiting examples of artifacts that may be removed include dust particles, bubbles, cracks in slide 116, writing on slide 116, shadows, visual noise such as in a grainy image, and the like. In some embodiments, an artifact may be partially removed and/or lowered in visibility.

Still referring to FIG. 1B, in some embodiments, an artifact may be removed using an artifact removal machine learning mode. In some embodiments, artifact removal machine learning model may be trained on a dataset including images, associated with images without artifacts. In some embodiments, artifact removal machine learning model may accept as an input an image including an artifact and may output an image without the artifact. For example, artifact removal machine learning model may accept as an input an image including a bubble in a slide and may output an image that does not include the bubble. In some embodiments, artifact removal machine learning model may include a generative machine learning model such as a diffusion model. A diffusion model may learn the structure of a dataset by modeling the way data points diffuse through a latent space. In some embodiments, artifact removal may be done locally. For example, and without limitation, imaging device 100 may include an already trained artifact removal machine learning model and may apply the model to an image. In some embodiments, artifact removal may be done externally. For example, imaging device 100 may transmit image data to another computing device and may receive an image with an artifact removed. In some embodiments, an artifact may be removed in real time. In some embodiments, an artifact may be removed based on identification by a user. For example, a user may drag a box around an artifact using a mouse cursor, and imaging device 100 may remove an artifact in the box.

Still referring to FIG. 1B, in some embodiments, imaging device 100 may remove an artifact from first integrated image 140a or any of first plurality of images prior to compilation. For instance, in some embodiments, imaging device 100 may remove an artifact from a second image 136b. In some embodiments, imaging device 100 may remove an artifact from a hybrid image, such as first integrated image 140a.

Still referring to FIG. 1B, in one or more embodiments, imaging device 100 may be configured to move slide port 144, slide 116, one or more components of optical system 120, or the like into a second position, wherein second location x' of specimen is within line of sight 132 of optical system 120. Second position may be based on one or more parameters, such as an original parameter set for first plurality of images or an updated parameter set. A new position may allow for a new location to be placed within the FOV 156 of optical component so that a different plurality of images from the previous plurality of images (e.g., z-stack) may be captured by imaging system. Second position may include, for example and without limitation, modifying a current position (e.g., first position) of optical system 120 relative to slide 116 and specimen 112, or vice versa, as a function of parameter set, as indicated by the directional arrows of FIG. 1B. For instance, and without limitation, first location x may include a first area of interest 128a located at (x, y), and second location x' may include a second area of interest 128b located at (x', y'). Second location x' may differ from first location x by, for example, a variance in an x and/or y coordinate value, and may be placed in line of sight 132 by a transition from first position to second position. For example, and without limitation, parameter set may indicate that second position is achieved by moving slide 116, for example, 5 mm in a particular direction, such as along the x-axis. Similarly, in another example, and without limitation, second position may be found by modifying optical system's original position by 5 mm in an opposing direction. In some embodiments, such movement may be done using actuator mechanism 124. In some embodiments, actuator mechanism 124 may move slide port 144 such that slide 116 is in a position relative to at least an optical system 120 such that optical sensor 120 may capture an image as directed by parameter set. For example, and without limitation, slide 116 may rest on slide port 144 and movement of slide port 144 may move slide 116 as well. In some embodiments, actuator mechanism 124 may move slide 116 such that slide 116 is in a position relative to at least an optical system 120 such that optical sensor 120 may capture an image as directed by parameter set. For example, slide 116 may be connected to actuator mechanism 124 such that actuator mechanism 124 may move slide 116 relative to at least an optical system 120. In some embodiments, actuator mechanism 124 may move at least an optical system 120 such that slide 116 is in a position relative to slide 116 such that optical system 120 may capture an image as directed by parameter set. For example, slide 116 may be stationary, and actuator mechanism 124 may move at least an optical system 120 into position relative to slide 116. In some embodiments, actuator mechanism 124 may move more than one of slide port 144, slide 116, and at least an optical system 120 such that they are in the correct relative positions. In some embodiments, actuator mechanism 124 may move slide port 144, slide 116, and/or at least an optical system 120 in real time. For example, and without limitation, user input of a parameter set may cause a substantially immediate movement of items by actuator mechanism 124.

Still referring to FIG. 1B, in some embodiments, imaging device 100 may capture a second plurality of images 144b of a second location x' of specimen 112. In some embodiments, imaging device 100 may capture second plurality of images 144 using optical system 120. In some embodiments, second plurality of images 144 may include an image of a second region of specimen 112, such as second area of interest 128b. In some embodiments, second plurality of images 144 may include an image of a region of an area captured in first plurality of images 144. For example, and without limitation, second plurality of images 144 may include a more zoomed in (i.e. different level of zoom), higher resolution per unit area, image of a region within first plurality of images. This may cause display of second plurality of images 144 to allow a user to detect smaller details within the imaged region. As previously mentioned, second plurality of images 144 may include a shift in x and y coordinates relative to first plurality of images 126. For example, and without limitation, second plurality of images 144 may partially overlap with first plurality of images 136. In some embodiments, second plurality of images 144 may include the same focus depths as first plurality of images 136. In some embodiments, second plurality of images 144 may include different focus depths than first plurality of images 136. In some embodiments, second plurality of images 144 may include the same quantity of layers or images as first plurality of images 136.

Still referring to FIG. 1B, each image 144a-e of second plurality of images 144 may be captured at different focus depths. For example, and without limitation, if a region of interest of a first image 144a is out of focus, then a second image 144b may use an auto focus system and/or a focus depth set in parameter set to capture second image, where second image is in focus at the area of interest. In a non-limiting example, capturing second image 144b may include detecting a height of specimen 112 at a specific imaging point of specimen and/or second area of interest 128b, and setting a focus height of the at least an optical system 120 based on the height (e.g., thickness t) at second area of interest.

Still referring to FIG. 1B, in some embodiments, imaging device 100 may capture second plurality of images 144 by an operator manipulating input interface of imaging device 100, creating second parameter set, then actuator mechanism 124 may cause movement of slide 116 relative to optical system 120 to start substantially immediately after the input interface was manipulated, then optical system 120 may capture second plurality of images 144 substantially immediately after actuator mechanism 124 completes its movement. Real-time actuator mechanism 124 movement and image capture may allow user to choose a specific area of interest and receive high resolution image of that region in real time, without having to wait for detailed images of the entire slide 116 to be captured. In some embodiments, artifacts may also be removed in real time. In some embodiments, image may also be annotated in real time. In a non-limiting example, a user may use a mouse cursor to hover over a position in any image and may scroll the mouse wheel indicating that user wishes to zoom in on that location. In this example, x coordinate and y coordinate of parameter set may be determined based on position of the cursor, and level of zoom of parameter set may be determined based on the amount that the user scrolled the mouse wheel. This process may be useful, for example, if a user is looking at an image of slide 116, finds a region of interest and wishes to zoom in on that region more than the resolution of the image would normally allow. Using this process, the user may adjust parameter set to zoom in and imaging device 100 may capture a higher resolution plurality of images, compile the images, and display the integrated images. This may be preferable over manually repeating a process of loading slide 116, setting parameters (to a higher resolution and/or zoom), and waiting for a device to generate and clean up an image.

Still referring to FIG. 1B, in one or more embodiments, imaging device 100 may be configured to compile second plurality of images 144 into a second integrated image 140b. For instance, and without limitation, second plurality of images 144 captured at second location x' of specimen 112 may be consolidated to create second integrated image 140b. In one or more embodiments, second plurality of images 144 may be compiled together to create second integrate image 140 busing image processing module as described above in this disclosure. As understood by one of ordinary skill in the art, any number of plurality of images, and thus any number of integrated images may be captured by imaging device 100. For instance, a third plurality of images 148 having one or more images 148a-e may be captures based on original parameter set or an updated parameter set. Third plurality of images may include images 148-a-e of a third location x" of specimen 112 after optical system 120 and/or slide 116 has been moved to a third position in any of the manners described above in this disclosure. Third plurality of mages may then be compiled by imaging device, such as a processor 104 to create third integrated image 140c of location x" of specimen 112.

Still referring to FIG. 1B, in some embodiments, imaging device 100 displays integrated images, plurality of images, or any individual images to operator. In some embodiments, first, second, or third integrated images 140a-c may be displayed to user using output device (e.g., a display of a remote device or imaging device 100). Any of integrated images, such as integrated image 140a-c may be displayed to a user or operator in real time. In some embodiments, first or second integrated images may be displayed to user using output interface. For example, and without limitation, any images described in this disclosure may be displayed to a user a display such as a screen. In some embodiments, any images described in this disclosure may be displayed to user in the context of a graphical user interface (GUI). For example, a GUI may include controls for navigating an image such as controls for zooming in or out or changing where is being viewed. A GUI may include a touchscreen. In some embodiments, displaying first or second integrated images to the user may include replacing a region of first image of a plurality of images with second image of a plurality of images to create a hybrid image (i.e. integrated image); and displaying the hybrid image to the user. As used herein, a "hybrid image" is an image constructed by combining a first image with a second image. In some embodiments, creation of a hybrid image in this way may preserve second image. For example, and without limitation, if second image covers a smaller area at a higher resolution per unit area than first image, then second image may replace a lower resolution per unit area segment of first area corresponding to the region covered by second image. In some embodiments, image adjustments may be made to offset visual differences between first image and second image at a border of first image and second image in hybrid image. In a non-limiting example, color may be adjusted such that background color of the images is consistent along the border of the images. As another non-limiting example, brightness of the images may be adjusted such that there is no stark difference between brightness of the images. In some embodiments, artifacts may be removed from second image and/or hybrid image as described above. In some embodiments, second image may be displayed to user in real time. For example, adjustments (such as annotations and/or artifact removal may be started substantially immediately after second image is captured, and an adjusted version of second image may be displayed to user substantially immediately after adjustments are done. In some embodiments, an unadjusted version of second image may be displayed to user while adjustments are being made. In some embodiments, where there are a plurality of images covering a specific region, when user zooms out using user interface, a lower resolution image of the region may be displayed.

Still referring to FIG. 1B, in some embodiments, imaging device 100 may transmit first image, second image, hybrid image, and/or a data structure including a plurality of images to an external device. Such an external device may include, in non-limiting examples, a phone, tablet, or computer. In some embodiments, such a transmission may configure the external device to display an image.

Still referring to FIG. 1B, imaging device 100, such as by processor 104, is configured to compare first integrated image 140a, second integrated image 140b, and/or third integrated image 140c to a fitness measure for quality assurance purposes. Comparing by, for example, may include first integrated image 140a to a first fitness measure and second integrated image 140b to a second fitness measure. In some embodiments, each integrated image may be compared to a fitness measure. For the purpose of this disclosure, a "fitness measure" is a standard or threshold for imaging quality. Fitness measure may be based on, include, and/or be compared to a degree of quality. For instance, and without limitation, if one of integrated images does not meet the standard or threshold, then the integrated image may be marked, or flagged, by processor 104 for correction. For example, and without limitation, if a level of clarity of an integrated image falls outside of a predetermined threshold (e.g., range or limit) for quality, such as clarity, then the integrated image may be flagged and processor 104 may iteratively capture updated plurality of images until an optimized version of the integrated image is captured. Quality may include levels of quality of images such as clarity, sharpness, focus, resolution, alignment, grain, color, value, and the like. For example, and without limitation, a location of specimen 112 may be revisited so that an updated multi-layer scan may be taken at the location so that an adjusted, optimized integrated image may be compiled. The corresponding parameter set may also be adjusted to optimize the updated integrated image. In one or more embodiments, processor 104 may be configured to generate a fitness machine-learning model. As used in the current disclosure, a "fitness machine-learning model" is a machine-learning model that is configured to compare a quality of an image to a standard. The fitness machine-learning model may be consistent with the machine-learning model as described below in FIG. 2. The locations that need to be revisited may be stored in a data structure, as discussed below.

With continued reference to FIG. 1B, in one or more embodiments, data described in this disclosure may be represented as a data structure. For instance, and without limitation, data may include image data such as first image data, second image data, integrated images, consolidated images, and the like. In some embodiments, a data structure may include one or more functions and/or variables, as a class might in object-oriented programming. In some embodiments, a data structure may include data in the form of a Boolean, integer, float, string, date, and the like. In a non-limiting example, an annotation data structure may include a string value representing text of the annotation. In some embodiments, data in a data structure may be organized in a linked list, tree, array, matrix, tenser, and the like. In a non-limiting example, annotation data structures may be organized in an array. In some embodiments, a data structure may include or be associated with one or more elements of metadata. A data structure may include one or more self-referencing data elements, which processor 104 may use in interpreting the data structure. In a non-limiting example, a data structure may include "<date>" and "</date>," tags, indicating that the content between the tags is a date. In another non-limiting example, a data structure may include "<flag>" and "</flag>," tags, indicating that the content tagged requires correction, as discussed above. Once the optimized integrated image has been created then it may be compared to fitness measure again. Such a process may be iteratively executed until updated figure meets the standard for quality; then the task is marked completed and the flag is removed from the integrated image.

Still referring to FIG. 1B, a data structure may be stored in, for example, memory 108 or a database. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 1B, in some embodiments, a data structure may be read and/or manipulated by processor 104. In a non-limiting example, an image data structure may be read and displayed to user. In another non-limiting example, an image data structure may be modified to remove an artifact, as described above.

Still referring to FIG. 1B, in some embodiments, a data structure may be calibrated. In some embodiments, a data structure may be trained using a machine learning algorithm. In a non-limiting example, a data structure may include an array of data representing the biases of connections of a neural network. In this example, the neural network may be trained on a set of training data, and a back propagation algorithm may be used to modify the data in the array. Machine learning models and neural networks are described further herein.

Still referring to FIG. 1B, the processor may be configured to generate a machine-learning model, such as fitness machine machine-learning model, using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. processor 104 may then calculate a likelihood table by calculating probabilities of different data entries and classification labels. processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

Still referring to FIG. 1B, processor 104 may be configured to generate a machine-learning model, such as fitness machine machine-learning model, using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1B, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm $$l = \sqrt{\sum_{i=0}^{n} a_i^2},$$

where $a_i$ is attribute number experience of the vector. Scaling and/or normalization may function to make vector comparison independent of absolute quantities of attributes, while preserving any dependency on the similarity of attributes; this may, for instance, be advantageous where cases represented in training data are represented by different quantities of samples, which may result in proportionally equivalent vectors with divergent values.

Figure 1C:
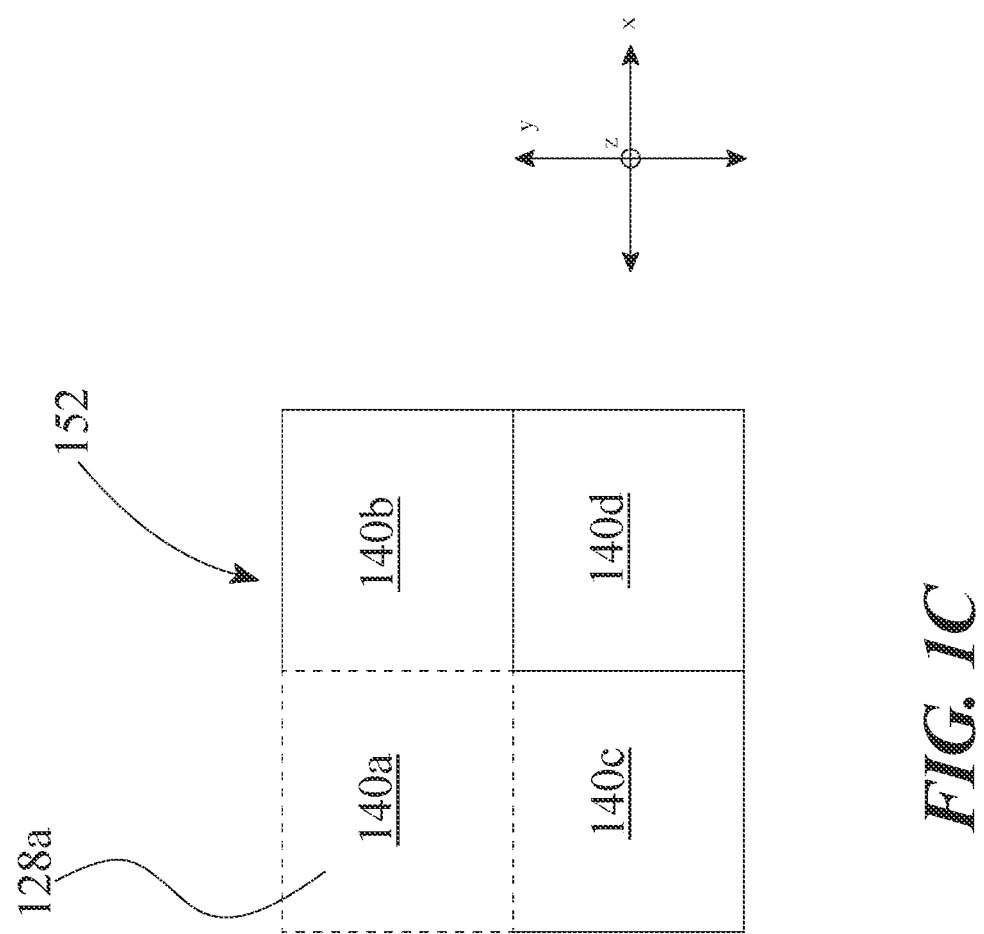

Now referring to FIG. 1C, imaging device 100 may be configured to combine first integrated image 140a and second integrated image 140b to create a consolidated image 152. For the purpose of this disclosure, a "consolidated image" is a processed image composed of a plurality of integrated images. For instance, first integrated image 140a and second integrated image 140b may each include a partial image of a whole image of specimen 112. Thus, first integrated image 140a and second integrated image 140b may be combined to include a whole image of at least a portion of specimen 112. As understood by one of ordinary skill in the art, though exemplary embodiments include a first and second integrated image, any number of integrated images may be used to create consolidated image 152. For example, and without limitation, first integrated image 140a, second integrated image 140b, third integrated image 140c, a fourth integrated image 140d, and so on, may be combined to create consolidated image 152. Similarly, any number of layers may be used to create integrated images.

Still referring to FIG. 1C, in one or more embodiments, processor 104 may be configured to iteratively create and/or recreate integrated images until all locations on slide 116 are imaged. In one or more embodiments, a revised integrated image may be created, as discussed previously in regard to comparing integrated image to a fitness measure. Iterations may include any number (e.g., two as described above). Then any number of compiled integrated images may be combined to create consolidated image.

Still referring to FIG. 1C, processor 104 may be configured to display any images described in this disclosure using a display device 144. As used in this disclosure, a "display device" is a device that is used to display content. A display device 144 may include a user interface. A "user interface," as used herein, is a means by which a user and a computer system interact; for example, through the use of input devices and software. A user interface may include a graphical user interface (GUI), command line interface (CLI), menu-driven user interface, touch user interface, voice user interface (VUI), form-based user interface, any combination thereof, and the like. A user interface may include a smartphone, smart tablet, desktop, or laptop operated by the user. In an embodiment, the user interface may include a graphical user interface. A "graphical user interface (GUI)," as used herein, is a graphical form of user interface that allows users to interact with electronic devices. In some embodiments, GUI may include icons, menus, other visual indicators, or representations (graphics), audio indicators such as primary notation, and display information and related user controls. A menu may contain a list of choices and may allow users to select one from them. A menu bar may be displayed horizontally across the screen such as pull down menu. When any option is clicked in this menu, then the pull down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access. Information contained in user interface may be directly influenced using graphical control elements such as widgets. A "widget," as used herein, is a user control element that allows a user to control and change the appearance of elements in the user interface. In this context a widget may refer to a generic GUI element such as a check box, button, or scroll bar to an instance of that element, or to a customized collection of such elements used for a specific function or application (such as a dialog box for users to customize their computer screen appearances). User interface controls may include software components that a user interacts with through direct manipulation to read or edit information displayed through user interface. Widgets may be used to display lists of related items, navigate the system using links, tabs, and manipulate data using check boxes, radio boxes, and the like.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine learning software program where the commands to be executed are determined in advance by a user and written in a programming language. Machine learning process may include, for example and without limitation, fitness machine learning process, which is used to compare integrated images to a predetermined threshold of the fitness measure.

Still referring to FIG. 2, "training data," as used herein, is data containing correlations that a machine-learning process may use to model relationships between two or more categories of data elements. For instance, and without limitation, training data 204 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example inputs may include integrated images and fitness measure and outputs may include an identifier of integrated image, such as a flag or approval of integrated image.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to subcategories of quality, as previously mentioned. For instance, and without limitation, subcategories may include clarity, sharpness, color, grain, resolution, focus, and the like, related to the quality of an integrated image. A subcategory of an integrated image may be compared to a predetermined threshold of fitness measure and then fitness machine-learning process may determined if a quality such as subcategory falls within or outside of the predetermined threshold. If the quality of the subcategory of integrated image falls within the predetermined threshold then the integrated image may be assigned the identifier of an optimized integrated image and used in combination with one or more optimized integrated images to create consolidated image. If the quality of the subcategory of integrated image falls outside of predetermined threshold then the integrated image may be assigned a flag (e.g., flagged), which then an updated integrated image may be created. Updated integrated image may then be compared to the fitness measure. This process may be iteratively executed until an updated integrated image is identified as an itemized integrated image.

With further reference to FIG. 2, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may identified as having poor quality data, where "poor quality" is defined as having a signal to noise ratio below a threshold value.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units In some embodiments, and with continued reference to FIG. 2, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include integrated image and fitness measure as described above as inputs, identifier as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 2, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 2, one or more processes or algorithms described above may be performed by at least a dedicated hardware unit 232. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 232 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 232 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 232 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 3:
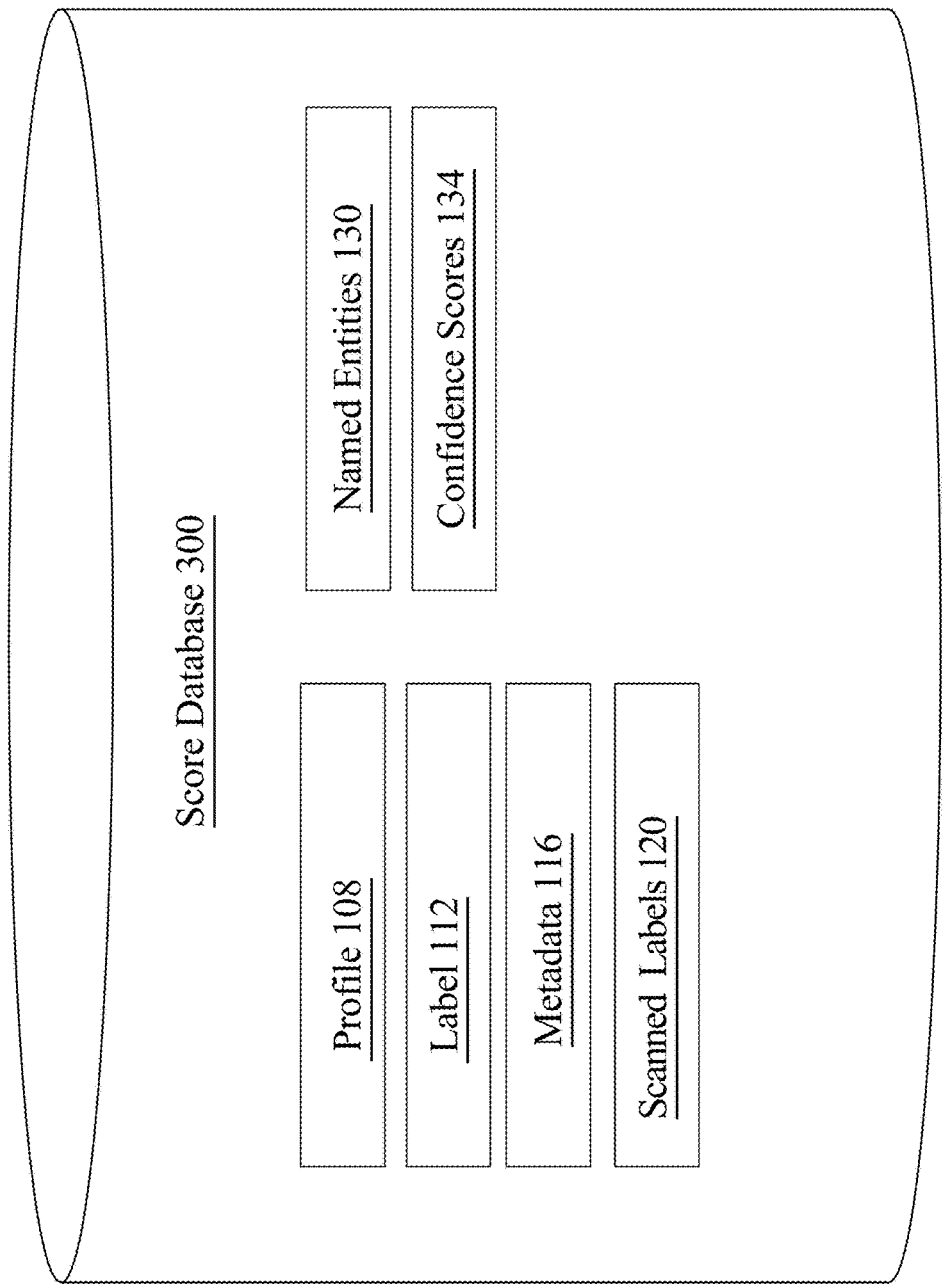
FIG. 3 is a block diagram of an exemplary embodiment of a score database in accordance with one or more embodiments of the present disclosure.

Now referring to FIG. 3, an exemplary score database 300 is illustrated by way of block diagram. In an embodiment, any past or present versions of data disclosed herein may be stored within including user profile 108, user label 112, metadata 116, a plurality of entity categories, scanned user labels 120, named entities, confidence scores, and the like. Processor 104 may be communicatively connected with score database 300. For example, in some cases, database 300 may be local to processor 104. Alternatively or additionally, in some cases, database 300 may be remote to processor 104 and communicative with processor 104 by way of one or more networks. Network may include, but not limited to, a cloud network, a mesh network, or the like. By way of example, a "cloud-based" system, as that term is used herein, can refer to a system which includes software and/or data which is stored, managed, and/or processed on a network of remote servers hosted in the "cloud," e.g., via the Internet, rather than on local servers or personal computers. A "mesh network" as used in this disclosure is a local network topology in which the infrastructure processor 104 connect directly, dynamically, and non-hierarchically to as many other computing devices as possible. A "network topology" as used in this disclosure is an arrangement of elements of a communication network. Score database 300 may be implemented, without limitation, as a relational database, a key-value retrieval database such as a NOSQL database, or any other format or structure for use as a database that a person skilled in the art would recognize as suitable upon review of the entirety of this disclosure. Score database 300 may alternatively or additionally be implemented using a distributed data storage protocol and/or data structure, such as a distributed hash table or the like. Score database 300 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Figure 4:
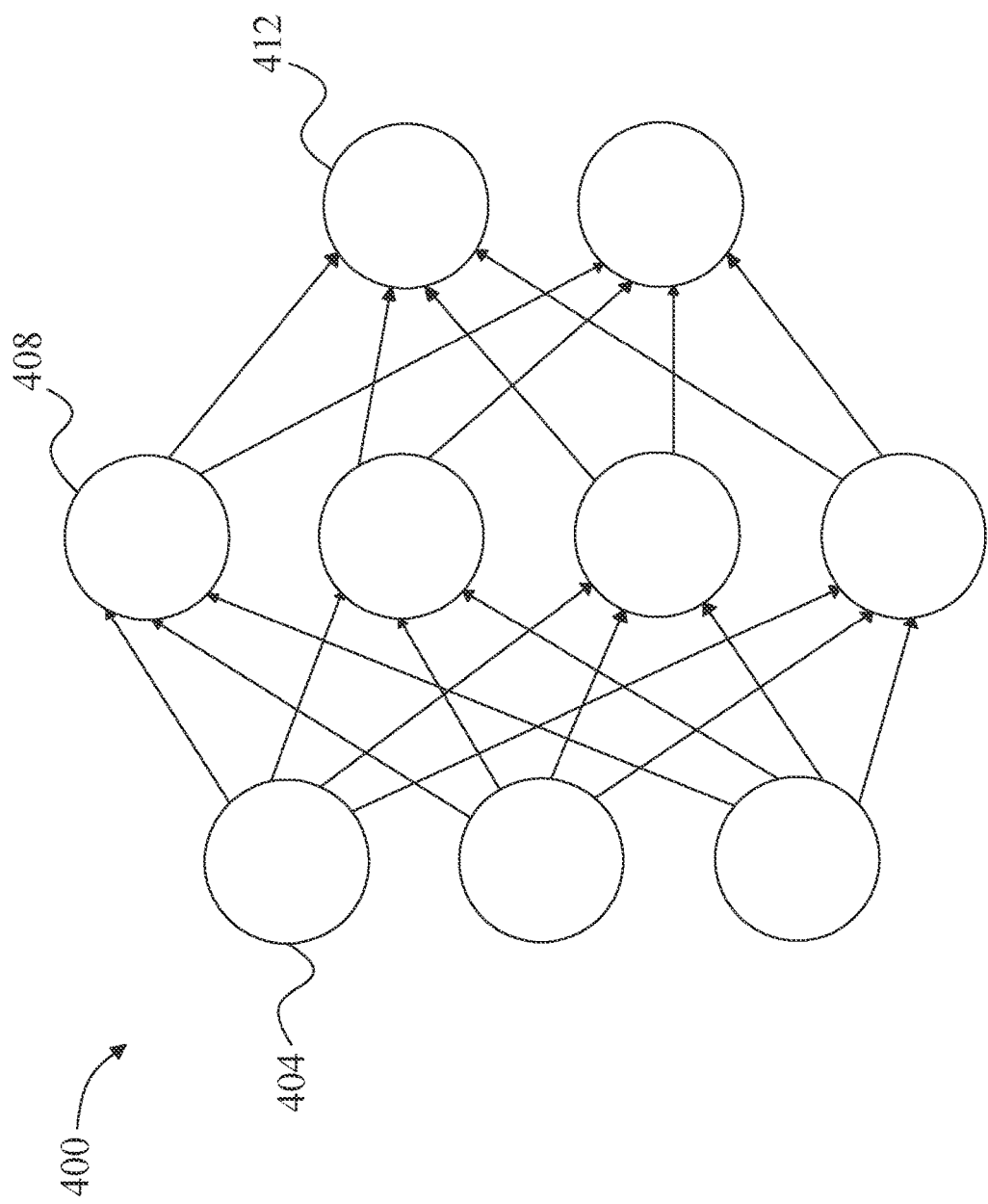
FIG. 4 is a diagram of an exemplary embodiment of a neural network in accordance with one or more embodiments of the present disclosure.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
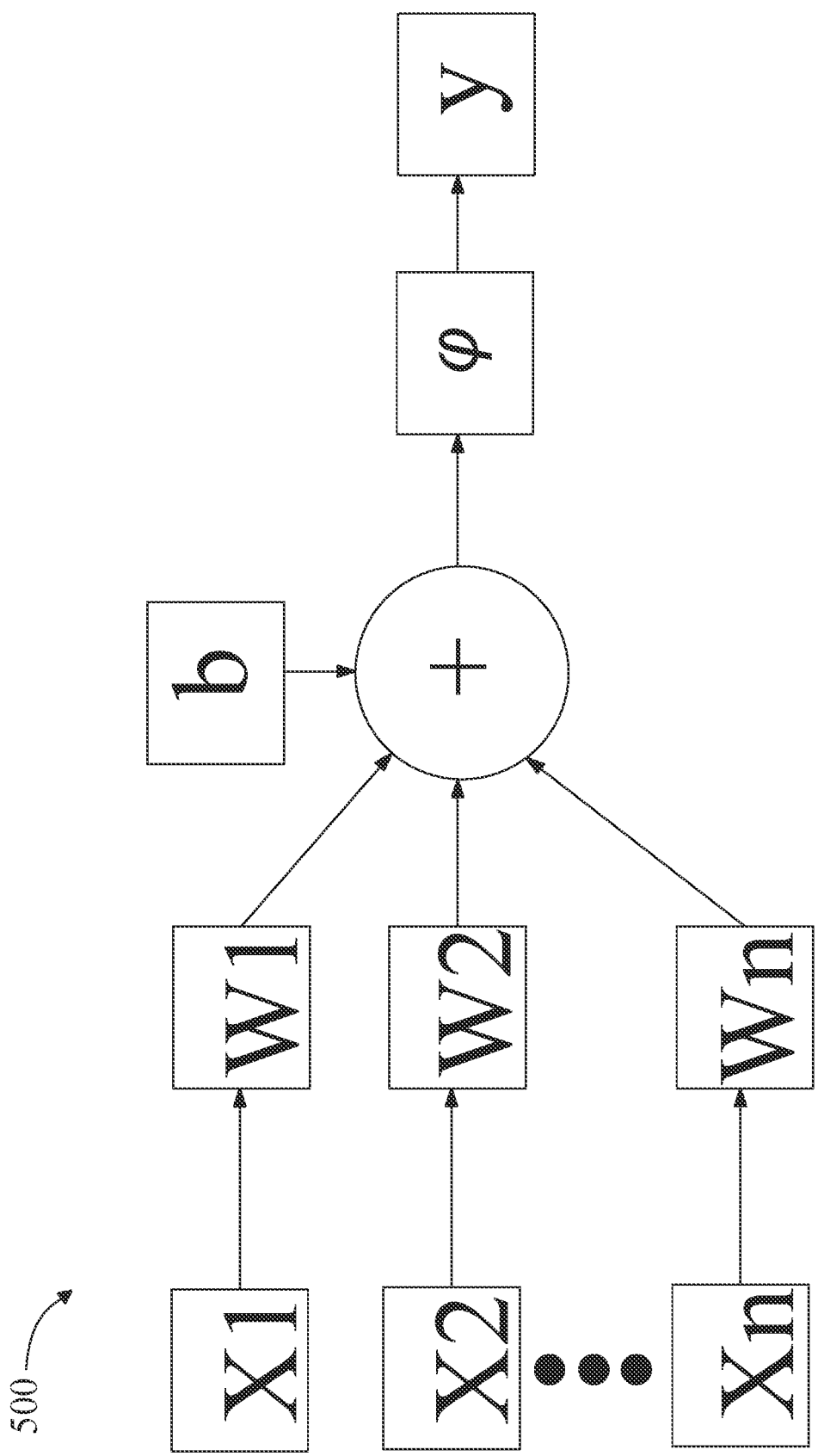
FIG. 5 is a diagram of an exemplary embodiment of a node of a neural network in accordance with one or more embodiments of the present disclosure.

Referring now to FIG. 5, an exemplary embodiment of a node of a neural network is illustrated. A node may include, without limitation, a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
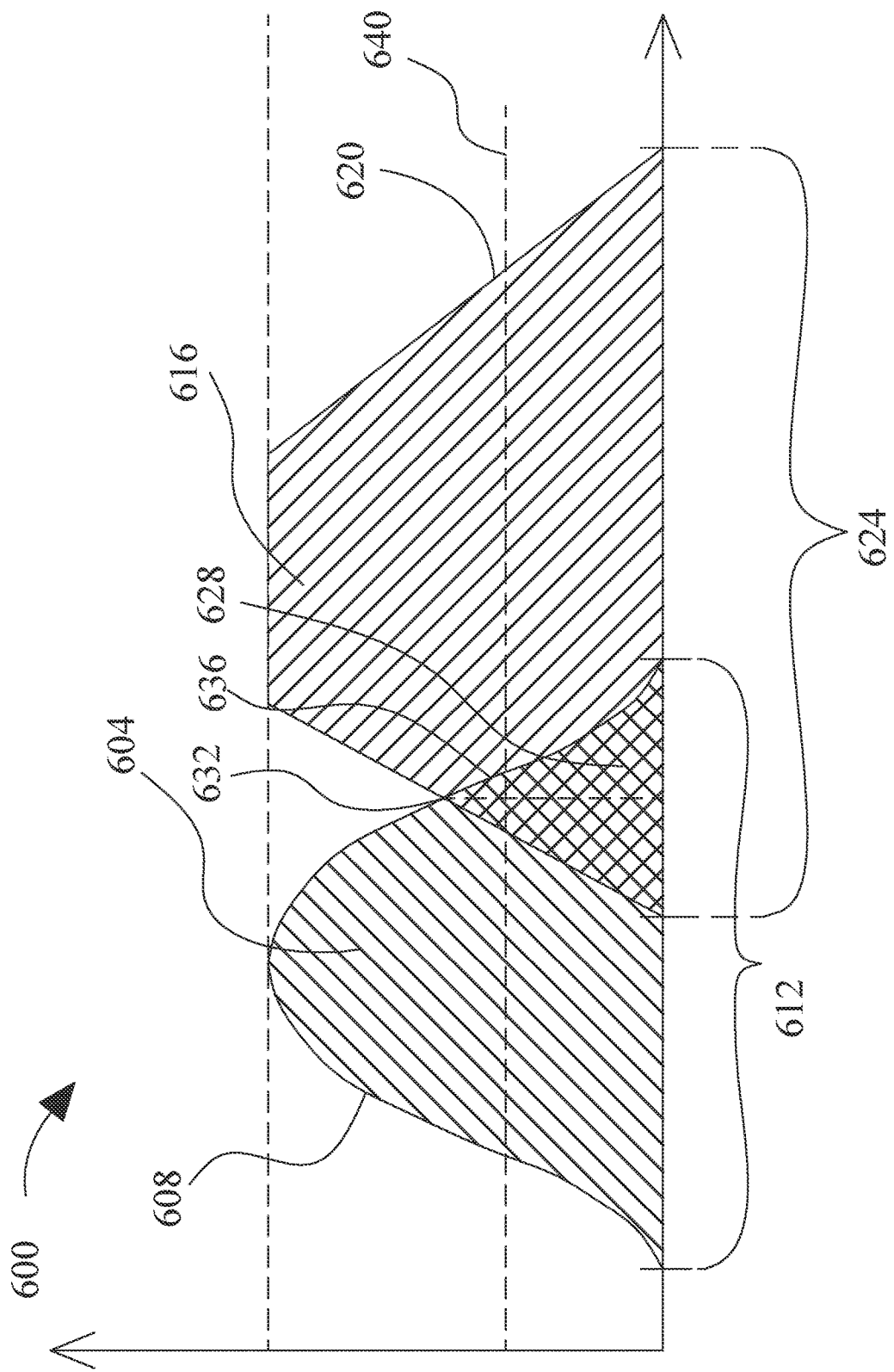
FIG. 6 an illustration exemplary embodiment of fuzzy set comparison in accordance with one or more embodiments of the present disclosure.

Now referring to FIG. 6, an exemplary embodiment of fuzzy set comparison 600 is illustrated. In a non-limiting embodiment, the fuzzy set comparison. In a non-limiting embodiment, fuzzy set comparison 600 may be consistent with fuzzy set comparison in FIG. 1A. In another non-limiting the fuzzy set comparison 600 may be consistent with the name/version matching as described herein. For example and without limitation, the parameters, weights, and/or coefficients of the membership functions may be tuned using any machine-learning methods for the name/version matching as described herein. In another non-limiting embodiment, the fuzzy set may represent a scanned user label 120 and historically scanned user label from FIG. 1A.

Alternatively or additionally, and still referring to FIG. 6, fuzzy set comparison 600 may be generated as a function of determining data compatibility threshold. The compatibility threshold may be determined by a computing device. In some embodiments, a computing device may use a logic comparison program, such as, but not limited to, a fuzzy logic model to determine the compatibility threshold and/or version authenticator. Each such compatibility threshold may be represented as a value for a posting variable representing the compatibility threshold, or in other words a fuzzy set as described above that corresponds to a degree of compatibility and/or allowability as calculated using any statistical, machine-learning, or other method that may occur to a person skilled in the art upon reviewing the entirety of this disclosure. In some embodiments, determining the compatibility threshold and/or version authenticator may include using a linear regression model. A linear regression model may include a machine learning model. A linear regression model may map statistics such as, but not limited to, frequency of the same range of version numbers, and the like, to the compatibility threshold and/or version authenticator. In some embodiments, determining the compatibility threshold of any posting may include using a classification model. A classification model may be configured to input collected data and cluster data to a centroid based on, but not limited to, frequency of appearance of the range of versioning numbers, linguistic indicators of compatibility and/or allowability, and the like. Centroids may include scores assigned to them such that the compatibility threshold may each be assigned a score. In some embodiments, a classification model may include a K-means clustering model. In some embodiments, a classification model may include a particle swarm optimization model. In some embodiments, determining a compatibility threshold may include using a fuzzy inference engine. A fuzzy inference engine may be configured to map one or more compatibility threshold using fuzzy logic. In some embodiments, a plurality of computing devices may be arranged by a logic comparison program into compatibility arrangements. A "compatibility arrangement" as used in this disclosure is any grouping of objects and/or data based on skill level and/or output score. Membership function coefficients and/or constants as described above may be tuned according to classification and/or clustering algorithms. For instance, and without limitation, a clustering algorithm may determine a Gaussian or other distribution of questions about a centroid corresponding to a given compatibility threshold and/or version authenticator, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Still referring to FIG. 6, inference engine may be implemented according to input a plurality of scanned user labels 120 and a plurality of historically scanned user labels. For instance, an acceptance variable may represent a first measurable value pertaining to the classification of a plurality of scanned user label 120 to an historically scanned user label. Continuing the example, an output variable may represent a confidence score. In an embodiment, a plurality of scanned user label 120 and/or an historically scanned user label may be represented by their own fuzzy set. In other embodiments, an evaluation factor may be represented as a function of the intersection two fuzzy sets as shown in FIG. 6, An inference engine may combine rules, such as any semantic versioning, semantic language, version ranges, and the like thereof. The degree to which a given input function membership matches a given rule may be determined by a triangular norm or "T-norm" of the rule or output function with the input function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \le x < b \\ \frac{c-x}{c-b}, \text{ if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

First fuzzy set 604 may represent any value or combination of values as described above, including any a plurality of scanned user label 120 and historically scanned user label. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 636 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, fitness measure may indicate a sufficient degree of overlap with fuzzy set representing images as described above. Each threshold may be established by one or more user inputs. Alternatively or additionally, each threshold may be tuned by a machine-learning and/or statistical process, for instance and without limitation as described in further detail below.

Figure 7:
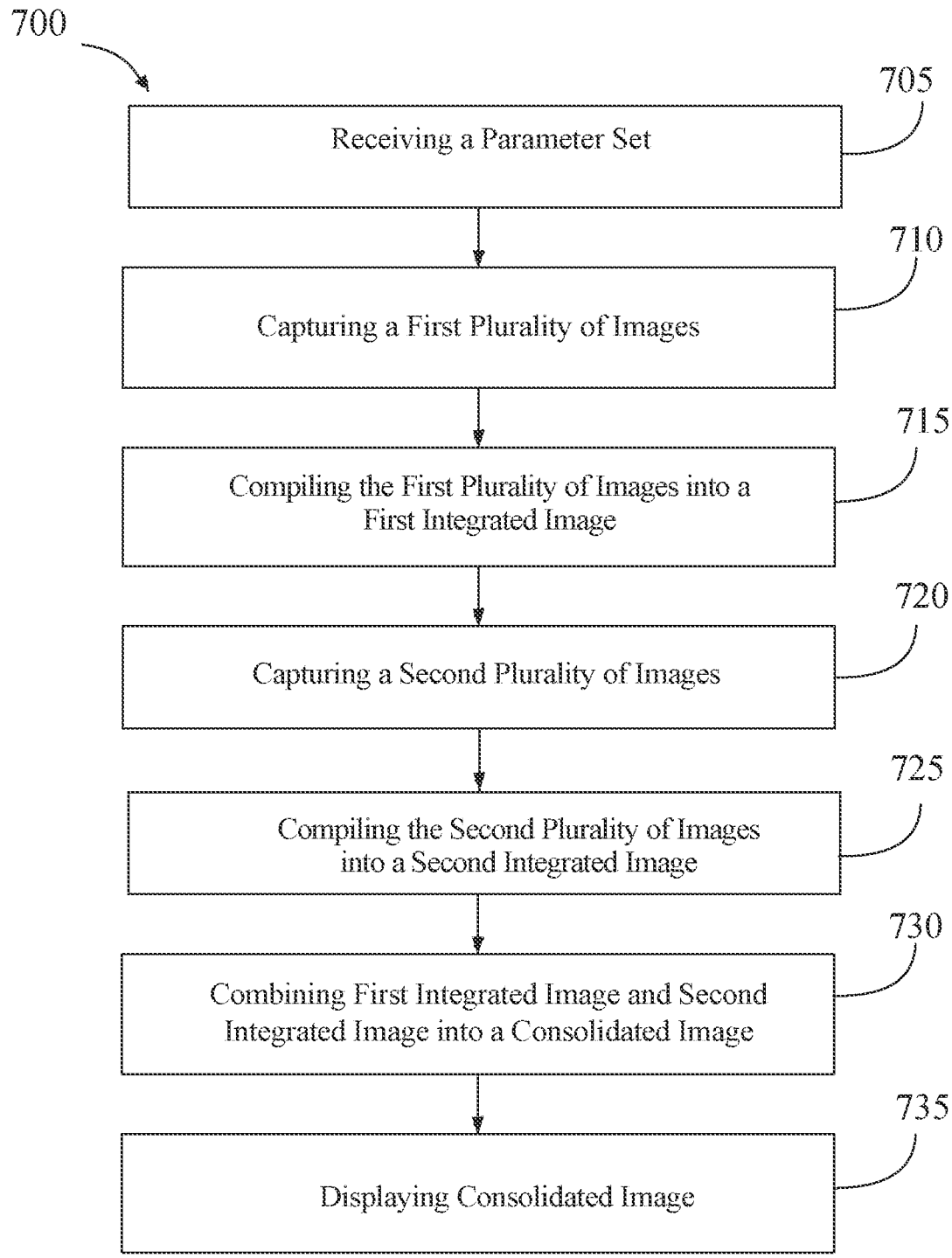
FIG. 7 is a flow diagram of an exemplary method for generating an image of a specimen in accordance with one or more embodiments of the present disclosure.

Referring now to FIG. 7, a flow diagram of an exemplary method 700 for generating an image of a specimen is illustrated. At step 705, method 700 includes receiving, using processor 104, a parameter set. This may be implemented as described and with reference to FIGS. 1-7.

At step 710, method 700 includes capturing, by the processor, a first plurality of images of a first area of interest at a first location of a specimen. This may be implemented as described and with reference to FIGS. 1-7.

At step 715, method 700 includes compiling, by the processor, compiling, by the processor, the first plurality of layers into a first integrated image. This may be implemented as described and with reference to FIGS. 1-7.

At step 720, method 700 includes capturing, by the processor, a second plurality of images of a second area of interest at a second location of the specimen. This may be implemented as described and with reference to FIGS. 1-7.

At step 725, method 700 includes compiling second plurality of layers into a second integrated image. This may be implemented as described and with reference to FIGS. 1-7.

At step 725, method 700 includes combining, by the processor, the first integrated image and the second integrated image into a consolidated image, and displaying, by the processor, the consolidated image. This may be implemented as described and with reference to FIGS. 1-7.

At step 730, method 700 includes displaying consolidated image. This may be implemented as described and with reference to FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An imaging device for image generation of a specimen, wherein the imaging device comprises circuitry configured to:
   capture a first plurality of images of a first location within a first area of interest of a specimen according to a first parameter set, wherein the first parameter set comprises a first plurality of focus distances, wherein at least a focus distance of the first plurality of focus distances corresponds to at least an image of the first plurality of images;
   compile a first integrated image as a function of the first plurality of images, wherein compiling the first integrated image comprises:

removing a first artifact within the first plurality of images using an artifact machine learning model comprising a generative machine learning model;

capture a second plurality of images of a second location within the first area of interest of the specimen according to the second parameter set, wherein the second parameter set comprises a second plurality of focus distances, wherein at least a focus distance of the second plurality of focus distances corresponds to at least an image of the second plurality of images;

compile the second plurality of images into a second integrated image;

combine the first integrated image and the second integrated image into a consolidated image; and display the consolidated image.

2. The imaging device of claim 1, wherein removing the first artifact comprises:

inputting the first plurality of images into the artifact machine learning model; and removing the first artifact within the first plurality of images using the artifact removal machine learning model.

3. The imaging device of claim 1, wherein the imaging device comprises circuitry configured to:

receive a third parameter set associated with a second area of interest of the specimen, wherein the third parameter set comprises a third focus depth;

capture a third plurality of images of the second area of interest of the specimen according to the third parameter set; and compile the third plurality of images into a third integrated image.

4. The imaging device of claim 3, wherein the imaging device comprises circuitry configured to combine the first integrated image, the second integrated image, and the third integrated image into the consolidated image.

5. The imaging device of claim 3, wherein the imaging device comprises circuitry configured to move an optical system from the first area of interest to the second area of interest, according to the third parameter set.

6. The imaging device of claim 1, wherein the second plurality of focus distances is not coextensive with the first plurality of focus distances.

7. The imaging device of claim 1, wherein the imaging device comprises circuitry configured to move an optical system from the first location to the second location.

8. The imaging device of claim 1, wherein the imaging device comprises circuitry configured to:

compare the first integrated image to a fitness measure; and flag the first integrated image if the first integrated image falls outside of a predetermined threshold of the fitness measure.

9. The imaging device of claim 8, wherein:

comparing the first integrated image comprises using a fitness machine-learning model comprises, wherein using the fitness machine-learning model comprises:

training the fitness machine-learning model using fitness training data, wherein the fitness training data contains a plurality of data entries containing examples of integrated images as inputs correlated to examples of fitness measures as outputs; and flagging the integrated image as a function of the comparison using the trained fitness machine-learning model.

10. The imaging device of claim 8, wherein the imaging device comprises circuitry configured to:

update, if the first integrated image is flagged, the first plurality of images;

compile the updated first plurality of images to create an updated integrated image;

compare the updated integrated image to the fitness measure; and identify an optimized integrated image if the updated integrated image falls within the predetermined threshold of the fitness measure.

11. A method of user for an imaging device for image generation of a specimen, wherein the method comprises:

capturing, using an imaging device, a first plurality of images of a first location within a first area of interest of a specimen according to a first parameter set, wherein the first parameter set comprises a first plurality of focus distances, wherein at least a focus distance of the first plurality of focus distances corresponds to at least an image of the first plurality of images;

compiling, using the imaging device, a first integrated image as a function of the first plurality of images, wherein compiling the first integrated image comprises:

removing, using the imaging device, a first artifact within the first plurality of images using an artifact machine learning model comprising a generative machine learning model;

capturing, using the imaging device, a second plurality of images of a second location within the first area of interest of the specimen according to the second parameter set, wherein the second parameter set comprises a second plurality of focus distances, wherein at least a focus distance of the second plurality of focus distances corresponds to at least an image of the second plurality of images;

compiling, using the imaging device, the second plurality of images into a second integrated image;

combining, using the imaging device, the first integrated image and the second integrated image into a consolidated image; and displaying, using a graphical user interface, the consolidated image.

12. The method of claim 11, wherein removing the first artifact and the second artifact comprises:

inputting the first plurality of images into the artifact machine learning model; and removing the first artifact within the first plurality of images and the second artifact within the second plurality of images using the artifact removal machine learning model.

13. The method of claim 11, wherein the method further comprises:

receiving, by the imaging device, a third parameter set associated with a second area of interest of the specimen, wherein the third parameter set comprises a third focus depth;

capturing, by the imaging device, a third plurality of images of the second area of interest of the specimen according to the third parameter set; and compiling, by the imaging device, the third plurality of images into a third integrated image.

14. The method of claim 13, wherein the method further comprises combining, by the imaging device, the first integrated image, the second integrated image, and the third integrated image into the consolidated image.

15. The method of claim 13, wherein the method further comprises moving, by the imaging device, an optical system from the first area of interest to the second area of interest, according to the third parameter set.

16. The method of claim 11, wherein the second plurality of focus distances is not coextensive with the first plurality of focus distances.

17. The method of claim 11, wherein the method further comprises moving, by the imaging device, an optical system from the first location to the second location.

18. The method of claim 11, wherein the method further comprises:
   comparing, by the imaging device, the first integrated image to a fitness measure; and
   flagging, by the imaging device, the first integrated image if the first integrated image falls outside of a predetermined threshold of the fitness measure.

19. The method of claim 18, wherein:
   comparing the first integrated image comprises using a fitness machine-learning model comprises, wherein using the fitness machine-learning mode comprises:
      training the fitness machine-learning model using fitness training data, wherein the fitness training data contains a plurality of data entries containing examples of integrated images as inputs correlated to examples of fitness measures as outputs; and
      flagging the integrated image as a function of the comparison using the trained fitness machine-learning model.

20. The method of claim 18, wherein the method further comprises:
   updating, by the imaging device, the first plurality of images if the first integrated image is flagged;
   compiling, by the imaging device, the updated first plurality of images to create an updated integrated image;
   comparing, by the imaging device, the updated integrated image to the fitness measure; and
   identifying, by the imaging device, an optimized integrated image if the updated integrated image falls within the predetermined threshold of the fitness measure.

* * * * *